United States Patent
Watabe et al.

(10) Patent No.: US 7,411,488 B2
(45) Date of Patent: Aug. 12, 2008

(54) TIRE LOCATION DETECTING APPARATUS CONFIGURED WITH ROTATION DIRECTION DETECTING DEVICES AND TRIGGERING DEVICE

(75) Inventors: Nobuya Watabe, Nagoya (JP); Masashi Mori, Oobu (JP)

(73) Assignee: DENSO Corporation, Kariya (JP)

( * ) Notice: Subject to any disclaimer, the term of this patent is extended or adjusted under 35 U.S.C. 154(b) by 13 days.

(21) Appl. No.: 11/406,369

(22) Filed: Apr. 19, 2006

(65) Prior Publication Data

US 2006/0238323 A1 Oct. 26, 2006

(30) Foreign Application Priority Data

Apr. 21, 2005 (JP) ............... 2005-123393

(51) Int. Cl.
*B60C 23/00* (2006.01)

(52) U.S. Cl. .................. 340/442; 340/340; 340/444; 340/445; 340/447; 340/438; 340/426.33

(58) Field of Classification Search ............... 340/442, 340/444, 445, 447, 438, 539.1, 426.33
See application file for complete search history.

(56) References Cited

U.S. PATENT DOCUMENTS

| | | | |
|---|---|---|---|
| 5,602,524 A | | 2/1997 | Mock et al. |
| 5,661,651 A * | | 8/1997 | Geschke et al. ............... 701/88 |
| 6,018,993 A | | 2/2000 | Normann et al. |
| 6,304,172 B1 * | | 10/2001 | Katou et al. ............... 340/445 |
| 6,362,731 B1 * | | 3/2002 | Lill ............... 340/445 |
| 6,362,733 B1 * | | 3/2002 | Momose et al. ............. 340/447 |
| 6,489,888 B1 | | 12/2002 | Honeck et al. |
| 6,725,712 B1 * | | 4/2004 | King et al. ............... 73/146.5 |
| 6,748,797 B2 * | | 6/2004 | Breed et al. ............... 73/146 |
| 6,897,770 B2 * | | 5/2005 | Lill ............... 340/445 |
| 7,010,968 B2 * | | 3/2006 | Stewart et al. ............... 73/146 |
| 7,131,323 B2 * | | 11/2006 | Hirota ............... 73/146 |

FOREIGN PATENT DOCUMENTS

| | | |
|---|---|---|
| EP | 1 172 656 | 1/2002 |
| JP | 11-020428 | 1/1999 |
| JP | 3212311 | 7/2001 |
| JP | 2005-157416 | 6/2005 |
| WO | 03/089260 | 10/2003 |

* cited by examiner

*Primary Examiner*—Daryl C Pope
(74) *Attorney, Agent, or Firm*—Nixon & Vanderhye P.C.

(57) ABSTRACT

A tire location detecting apparatus for a vehicle with four wheels includes four rotation direction detecting devices, four transmitters, a triggering device, a receiver, and a controller. Each of the rotation direction detecting devices outputs a rotation direction signal which is then transmitted by an associated one of the transmitters. The triggering device triggers the transmitter on a first one of the four wheels to transmit an identification signal specific thereto. The receiver receives all of the signals transmitted from transmitters and provides those signals to the controller. The controller identifies the transmitter and tire on the first wheel based on the identification signal transmitted from the transmitter on the first wheel and determines, for each of the transmitters, whether the transmitter and the associated tire are located on one of the right-side wheels or one of the left-side wheels based on the rotation direction signal transmitted from the transmitter.

17 Claims, 16 Drawing Sheets

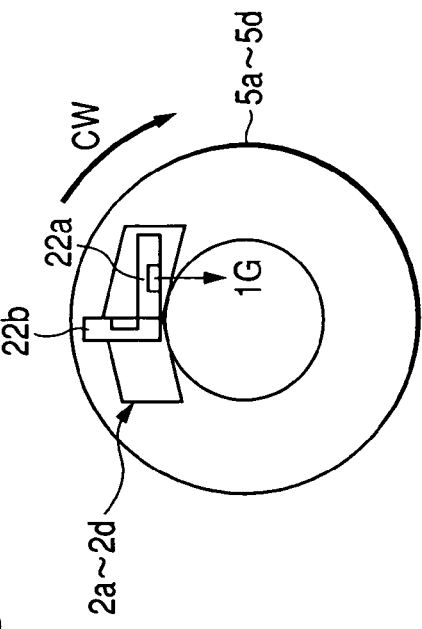
FIG. 4A1
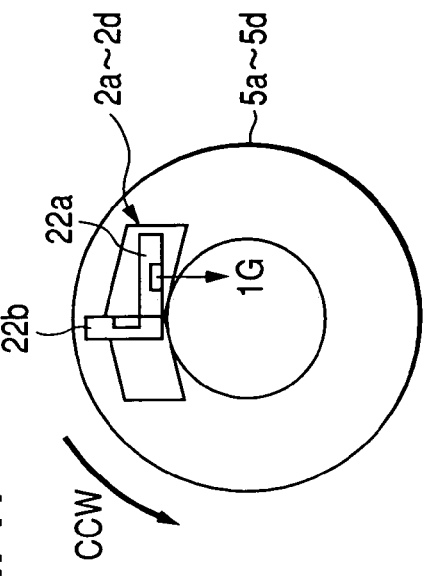
FIG. 4B1
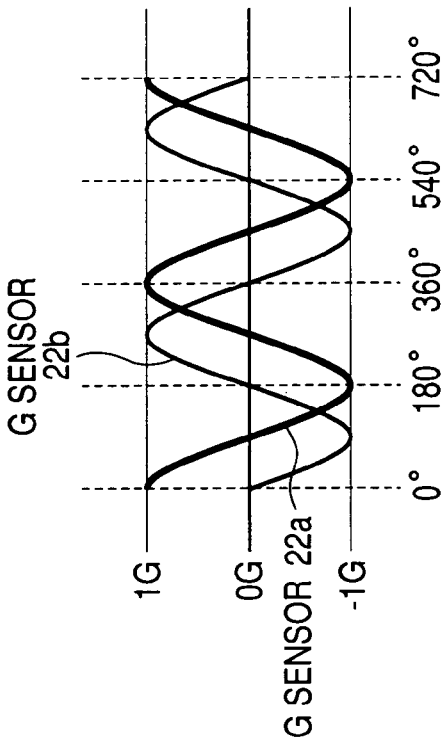
FIG. 4A2
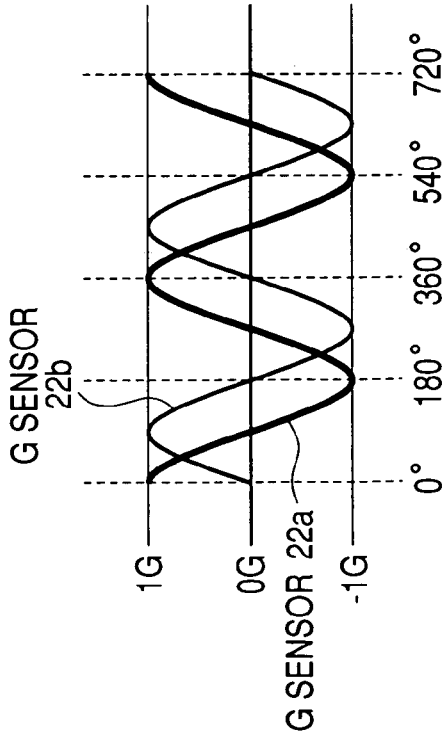
FIG. 4B2

TIRE LOCATION DETECTING APPARATUS CONFIGURED WITH ROTATION DIRECTION DETECTING DEVICES AND TRIGGERING DEVICE

CROSS-REFERENCE TO RELATED APPLICATION

This application is based on and claims priority from Japanese Patent Application No. 2005-123393, filed on Apr. 21, 2005, the content of which is hereby incorporated by reference into this application.

BACKGROUND OF THE INVENTION

1. Technical Field of the Invention

The present invention relates generally to tire location detecting apparatuses for automatically detecting the locations of tires on a vehicle and tire inflation pressure detecting apparatuses for detecting the inflation pressures of tires on a vehicle.

More particularly, the invention relates to an efficient tire location detecting apparatus which is integrated into a direct-type tire inflation pressure detecting apparatus.

2. Description of the Related Art

Conventional direct-type tire inflation pressure detecting apparatuses generally include a plurality of transmitters and a receiver.

Each of the transmitters is directly installed to one of a plurality of wheels of a vehicle and includes a pressure sensor working to sense the inflation pressure of a tire mounted on the wheel. Each of the transmitters is configured to transmit a pressure signal representative of the inflation pressure of the tire sensed by the pressure sensor.

The receiver is installed to the body of the vehicle and includes at least one antenna. The receiver is configured to receive the pressure signals transmitted from the transmitters through the antenna and determine the inflation pressures of the tires based on the respective received pressure signals.

In the above arrangement, in addition to the pressure signals sent out from the transmitters, the receiver may also receive pressure signals that are sent out from external transmitters. However, it is impossible for the receiver to determine whether a pressure signal received thereby has been sent out from one of the transmitters or from an external transmitter. Moreover, it is also impossible for the receiver to detect the locations of the transmitters (i.e., the tires) on the vehicle. In other words, the receiver cannot determine the wheel to which the transmitter having sent out a pressure signal and the tire whose inflation pressure is indicated by the pressure signal are mounted.

To solve the above problems, each of the transmitters may be configured to transmit an identification signal (to be referred to as ID signal hereinafter) representative of the identity thereof along with the pressure signal. On the other hand, the receiver may be configured to have registered therein reference ID signals, each of which coincides with the ID signal of one of the transmitters and is associated with the location of that transmitter.

Thus, the receiver may work to compare an ID signal received thereby with the reference ID signals registered therein and identify the transmitter which has sent out the ID signal when the ID signal coincides with one of the reference ID signals.

Consequently, the receiver can identify the wheel to which the identified transmitter is mounted. More specifically, the receiver can determine whether the wheel is a FR (front-right), a FL (front-left), a RR (rear-right), or a RL (rear-left) wheel of the vehicle. Further, the receiver can determine the inflation pressure of the tire fitted on the identified wheel based on the pressure signal received along with the ID signal.

However, with the above configuration, it is required to previously register the ID signals specific to the respective transmitters as reference ID signals in the receiver through associating the ID signals with the locations of the respective transmitters on the vehicle (i.e., the wheels on which the respective transmitters are mounted). Moreover, as tire replacement or rotations are performed, it is required to update the reference ID signals in the receiver.

However, the registration of the ID signals in the receiver is a time-consuming task, and thus it is required to automatically perform the registration task. Further, for automatically performing the registration task, it is required to automatically detect the locations of the transmitters (i.e., the locations of the associated tires) on the vehicle.

To meet the above requirements, U.S. Pat. No. 5,602,524 proposes a method, according to which a triggering device is provided for each of the wheels to transmit a trigger signal, one of the transmitters transmits the ID signal specific thereto to the receiver upon being triggered by the trigger signal, and the receiver associates the ID signal and the location of the triggered transmitter and registers therein the ID signal as a reference ID signal.

However, with this method, a triggering device is required for each wheel, thus increasing the parts count and manufacturing cost of the tire inflation pressure detecting apparatus.

International publication No. WO 031089260 proposes a method, according to which a dual axis accelerometer is provided in each transmitter to automatically detect the location of the transmitter and thus that of the tire associated with the transmitter.

However, with this method, it is only possible to determine the right/left location of the transmitter.

U.S. Pat. No. 6,018,993 proposes a method, according to which the receiver accumulates the strengths of signals received from the transmitters via respective receiving antennas and determines the locations of the transmitters based on the respective accumulated strengths of signals.

However, with this method, it takes time to accumulate the strengths of signals. Moreover, an additional means (or device) is required to perform the accumulation task, increasing the manufacturing cost of the tire inflation pressure detecting apparatus.

U.S. Pat. No. 6,489,888 proposes a method, according to which the receiver determines the locations of the transmitters based on the respective distributions of RSSI (Received Signal Strength Indicator) values for signals transmitted from the transmitters.

However, with this method, it takes time to obtain the distributions of RSSI values. Moreover, an additional means (or device) is required to obtain the distributions of RSSI values, increasing the manufacturing cost of the tire inflation pressure detecting apparatus.

SUMMARY OF THE INVENTION

The present invention has been made in view of the above-mentioned problems.

It is, therefore, an object of the present invention to provide an efficient tire location detecting apparatus for automatically detecting the locations of tires on a vehicle.

It is another object of the present invention to provide a tire inflation pressure detecting apparatus for a vehicle which integrated thereinto the tire location detecting apparatus to automatically detect the locations as well as the inflation pressures of tires on the vehicle.

In accordance with the present invention, a tire location detecting apparatus, which is provided on a vehicle to detect locations of four tires each of which is fitted on one of a front-right, a front-left, a rear-right, and a rear-left wheel of the vehicle, includes four rotation direction detecting devices, four transmitters, a triggering device, a receiver, and a controller.

Each of the four rotation direction detecting devices is mounted on one of the four wheels of the vehicle to detect rotation direction of the wheel and outputs a rotation direction signal representative of the detected rotation direction.

Each of the four transmitters is mounted on one of the four wheels of the vehicle to have association with the tire and the rotation direction detecting device on one of the wheels. Each of the transmitters works to transmit, at a predetermined time, an identification signal specific thereto along with the rotation direction signal outputted from the associated rotation direction detecting device.

The triggering device is disposed on the body of the vehicle. The triggering device works to send out a trigger signal which causes the transmitter on a first one of the four wheels of vehicle to transmit the identification signal specific thereto in response to the trigger signal.

The receiver is arranged on the body of the vehicle. The receiver works to receive all of the identification and rotation direction signals transmitted by the transmitters at the predetermined times. The receiver also works to receive the identification signal transmitted by the transmitter on the first wheel in response to the trigger signal.

The controller is electrically connected with the triggering device and the receiver to control operation of the triggering device and the receiver. The controller performs:

a first process of identifying the transmitter and the tire on the first wheel of the vehicle based on the identification signal transmitted by the transmitter on the first wheel in response to the trigger signal, and a second process of determining, for each of the transmitters, whether the transmitter and the associated tire are located on one of the right-side wheels or one of the left-side wheels of the vehicle based on the rotation direction signal transmitted from the transmitter.

According to an embodiment of the invention, in the above tire location detecting apparatus, the controller includes a memory and has stored in the memory reference identification signals, each of which coincides with the identification signal specific to one of the transmitters and is associated with one of the wheels, and a plurality of tire location sequences available for the tires of the vehicle. Moreover, the controller further performs a third process of determining whether a tire rotation has been made for the tires of the vehicle through comparison of the identification signal specific to the transmitter that is currently on the first wheel with the reference identification signal stored in the memory in association with the first wheel.

If it is determined through the third process that no tire rotation has been made for the tires, the controller further performs a fourth process of identifying each of the transmitters and associated tires on the other three wheels of the vehicle based on the reference identification signals stored in the memory in association with the three wheels.

Otherwise, if it is determined through the third process that a tire rotation has been made for the tires, the controller further performs:

a fourth process of identifying the transmitter and the tire on a second one of the wheels of the vehicle which has the same right/left location as the first wheel, a fifth process of identifying, among the plurality of tire rotation sequences stored in the memory, the tire rotation sequence in which the tire rotation has been made for the tires of the vehicle through comparison of the identification signals specific to the transmitters that are currently on the first and second wheels with all of the reference identification signals stored in the memory, and a sixth process of identifying each of the transmitters and associated tires on a third and a fourth one of the wheels, both of which have a right/left location opposite to that of the first and second wheels, based on the identified tire rotation sequence.

According to another embodiment of the invention, the above tire location detecting apparatus further includes a second triggering device, which is disposed on the body of the vehicle to send out a second trigger signal which causes the transmitter on a second one of the four wheels, which has a right/left location opposite to that of the first wheel, to transmit the identification signal specific thereto in response to the second trigger signal.

Moreover, the receiver further works to receive the identification signal transmitted by the transmitter on the second wheel in response to the second trigger signal. The controller further performs:

a third process of identifying the transmitter and the tire on the second wheel of the vehicle based on the identification signal transmitted by the transmitter on the second wheel in response to the second trigger signal, a fourth process of identifying the transmitter and the tire on a third one of the four wheels which has the same right/left location as the first wheel, and a fifth process of identifying the transmitter and the tire on a fourth one of the four wheels which has the same right/left location as the second wheel.

According to yet another embodiment of the invention, in the above tire location detecting apparatus, the trigger signal sent out from the triggering device further causes the transmitter on a second one of the four wheels, which has a right/left location opposite to that of the first wheel, to transmit the identification signal specific thereto in response to the trigger signal.

Moreover, the receiver further works to receive the identification signal transmitted by the transmitter on the second wheel in response to the trigger signal. The controller further performs:

a third process of identifying the transmitter and the tire on the second wheel of the vehicle based on the identification signal transmitted by the transmitter on the second wheel in response to the trigger signal, a fourth process of identifying the transmitter and the tire on a third one of the four wheels which has the same right/left location as the first wheel, and a fifth process of identifying the transmitter and the tire on a fourth one of the four wheels which has the same right/left location as the second wheel.

In the above configuration, the transmitter on the first wheel may transmit the identification signal specific thereto immediately after the sending out of the trigger signal by the triggering device, while the transmitter on the second wheel transmits the identification signal specific thereto after a predetermined time Tw from the sending out of the trigger signal by the triggering device. The time Tw may be predetermined to be longer than a time Ttf required for the transmitter on the first wheel to transmit the identification signal specific thereto to the receiver.

Otherwise, in the above configuration, in response to the trigger signal, the transmitter on the first wheel may transmit a plurality of times the identification signal specific thereto at time intervals of Twr, while the transmitter on the second wheel transmits a plurality of times the identification signal specific thereto at time intervals of Twl, Twl being longer than Twr. Further, the following relationships may be preferably specified:

$Twr > Ttf$, and $Twl > Ttf + Twr$, where, Ttf is a time required for the transmitter on the first wheel to complete one transmission of the identification signal specific thereto.

Else, in the above configuration, a second triggering device may be further included which is disposed on the body of the vehicle to send out a second trigger signal, which causes both the transmitters on the third and fourth wheels of the vehicle to transmit the respective identification signals in response to the second trigger signal. Moreover, the receiver may further work to receive the identification signals transmitted by the transmitters on the third and fourth wheels in response to the second trigger signal. Instead of the second, fourth, and fifth processes, the controller may perform:

a sixth process of identifying the transmitter and the tire on the third wheel of the vehicle based on the identification signal transmitted by the transmitter on the third wheel in response to the second trigger signal, and a seventh process of identifying the transmitter and the tire on the fourth wheel of the vehicle based on the identification signal transmitted by the transmitter on the fourth wheel in response to the second trigger signal.

According to yet another embodiment of the invention, in the above tire location detecting apparatus, each of the rotation direction detecting devices is integrated into the associated one of the transmitters, and both the triggering device and the controller are integrated into the receiver.

According to still another embodiment of the invention, in the above tire location detecting apparatus, each of the rotation direction detecting devices includes a first accelerometer, which works to output a first acceleration signal representative of a centrifugal acceleration of the wheel, and a second accelerometer, which works to output a second acceleration signal representative of a tangential acceleration of the wheel, and determines the rotation direction of the wheel based on the lead/lag relationship in phase between the first and second acceleration signals.

According to yet still another embodiment of the invention, the above tire location detecting apparatus is integrated into a tire inflation pressure detecting apparatus provided on the vehicle to detect inflation pressures of the tires.

The tire inflation pressure detecting apparatus further includes four pressure sensors, each of which is mounted on one of the four wheels of the vehicle to sense inflation pressure of the tire on the wheel and output a pressure signal representative of the sensed inflation pressure.

Each of the transmitters works to transmit, at the predetermined time, the pressure signal outputted from an associated one of the pressure sensors along with the identification signal and the rotation direction signal.

The receiver works to receive all of the pressure, identification, and rotation direction signals transmitted by the transmitters at the predetermined times.

The controller further performs a third process of determining, for each of the transmitters, the inflation pressure of the tire associated with the transmitter based on the pressure signal transmitted form the transmitter.

Consequently, through providing the above tire location detecting apparatus and tire inflation pressure detecting apparatus, the objects of the present invention are achieved.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIGS. 4A1-4B2 are views illustrating the relationship between the rotation direction of the vehicle wheel and the acceleration signals outputted from the accelerometers in FIG. 3;

DESCRIPTION OF THE PREFERRED EMBODIMENTS

Figure 1:
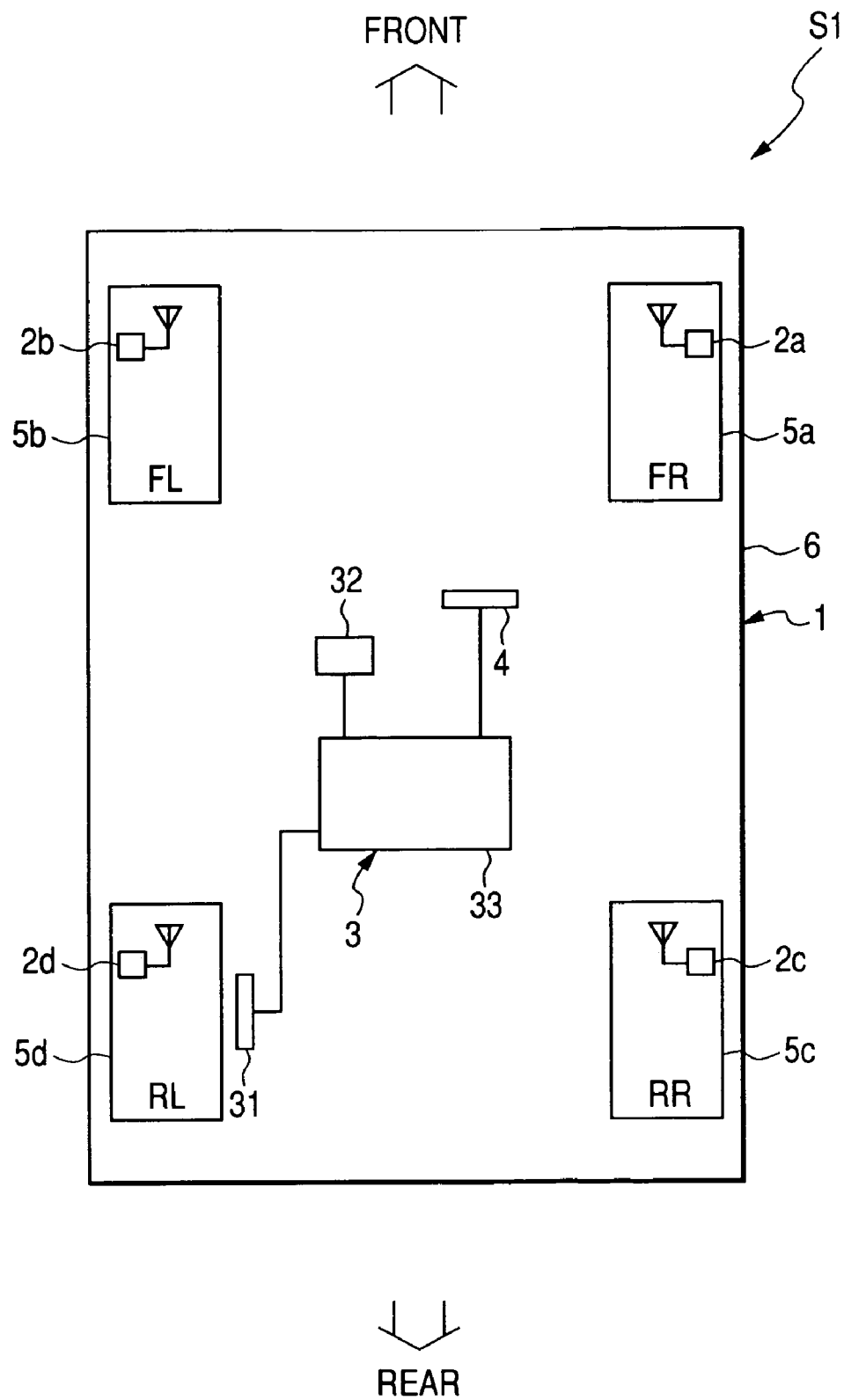
FIG. 1 is a schematic view illustrating the overall configuration of a tire inflation pressure detecting apparatus according to the first embodiment of the invention.

The preferred embodiments of the present invention will be described hereinafter with reference to FIGS. 1-16.

It should be noted that, for the sake of clarity and understanding, identical components having identical functions in different embodiments of the invention have been marked, where possible, with the same reference numerals in each of the figures.

First Embodiment

FIG. 1 shows the overall configuration of a tire inflation pressure detecting apparatus S1 according the first embodiment of the invention.

The tire inflation pressure detecting apparatus S1 is installed to a vehicle 1 and configured to sense the inflation pressures of four tires each of which is fitted on one of four wheels 5a-5d of the vehicle 1 (i.e., the FR wheel 5a, the FL wheel 5b, the RR wheel 5c, and the RL wheel 5d).

As shown in FIG. 1, the tire inflation pressure detecting apparatus S1 includes four transmitters 2a-2d, each of which is installed to a corresponding one of the four wheels 5a-5d, a receiver 3 installed to the body 6 of the vehicle 1, and a warning device 4 electrically connected to the receiver 3.

Each transmitter 2a-2d works to sense the inflation pressure of the corresponding tire and transmit a frame that contains a pressure signal representative of the sensed inflation pressure of the tire. Moreover, each transmitter 2a-2d also works to detect the rotation direction of the corresponding wheel 5a-5d.

Figure 2A:
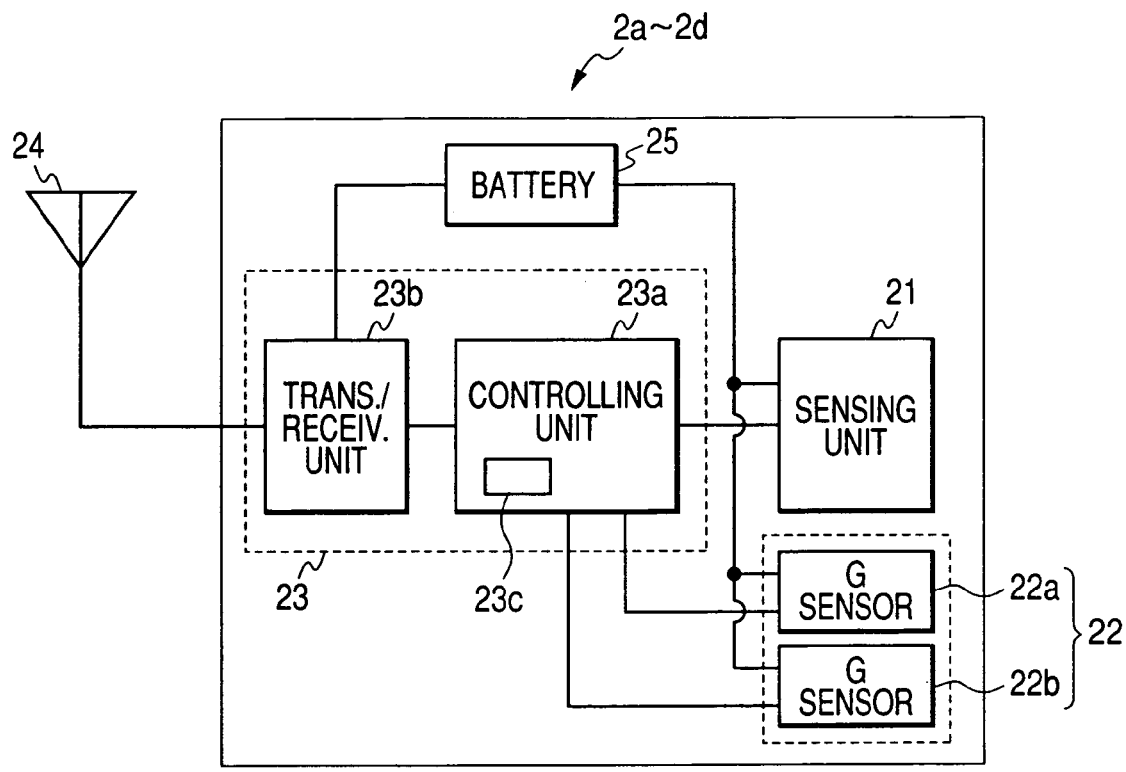
FIG. 2A is a block diagram showing the overall configuration of a transmitter of the tire inflation pressure detecting apparatus of FIG. 1.

Referring to FIG. 2A, each transmitter 2a-2d is configured with a sensing unit 21, an acceleration detecting unit 22, a microcomputer 23, an antenna 24, and a battery 25. The battery 25 works to supply electric power necessary for operation of the other units 21-24.

The sensing unit 21 is configured with sensors, such as a diaphragm-type pressure sensor and a temperature sensor, and works to output signals representative of the sensed inflation pressure of the tire and temperature of air in the tire.

The acceleration detecting unit 22 is configured with two accelerometers (to be referred to as G sensors hereinafter) 22a and 22b. The acceleration detecting unit 22 works to sense accelerations of the corresponding wheel 5a-5d and output acceleration signals representative of the detected accelerations. More specifically, as to be described in detail later, the G sensors 22a and 22b work to sense centrifugal and tangential accelerations of the corresponding wheel 5a-5d, respectively.

The microcomputer 23 is of a well-known type and functionally includes a controlling unit 23a and a transmitting/receiving unit 23b. The microcomputer 23 is configured to implement predetermined processes in accordance with a program installed in a memory 23c of the controlling unit 23a.

In addition, in the memory 23c of the controlling unit 23a, there is stored an ID signal that represents identification information specific to the transmitter 2a-2d for identifying it among other transmitters.

The controlling unit 23a works to receive signals outputted from the sensing unit 21 and process those signals. The controlling unit 23a also works to assemble a frame, which contains the processed signals and the ID signal, and provide the frame to the transmitting/receiving unit 23b.

The transmitting/receiving unit 23b works to transmit the frame provided by the controlling unit 23a via the antenna 24 to the receiver 3. The transmitting/receiving unit 23b also works to receive via the antenna 24 a trigger signal transmitted from the receiver 3.

The process of providing the frame from the controlling unit 23a to the transmitting/receiving unit 23b is performed, either periodically at predetermined time intervals (e.g., 1 minute) or upon reception of the trigger signal from the receiver 3, in accordance with the program installed in the memory 23c. Further, to differentiate a transmission made periodically from that made in response to the trigger signal, there is also contained in the frame trigger information indicative of whether or not the transmitting/receiving unit 23b has received the trigger signal. Consequently, the receiver 3 can determine for each of the frames transmitted from the transmitters 2a-2d whether it is transmitted periodically or in response to the trigger signal.

Further, the controlling unit 23a works to receive the acceleration signals outputted from the acceleration detecting unit 22 and determine the rotation direction of the corresponding wheel 5a-5d based on the acceleration signals. More specifically, the controlling unit 23a works to determine whether the corresponding wheel 5a-5d is rotating in the clockwise (CW) direction or in the counterclockwise (CCW) direction. Then, the controlling unit 23a assembles a rotation direction signal representative of the determined rotation direction into the above-described frame along with other signals. Otherwise, the controlling unit 23a may assemble the rotation direction signal into another frame and provide it to the transmitting/receiving unit 23b in accordance with the program installed in the memory 23c.

Additionally, the transmitter 2a-2d is fixed, for example, to an air valve of the corresponding wheel 5a-5d of the vehicle 1 and at least the sensing unit 21 thereof is placed inside the corresponding tire so as to be exposed to the air in the tire.

The receiver 3 works to receive all of the frames transmitted from the transmitters 2a-2d and determine the respective inflation pressures of the four tires based on the signals contained in the received frames. The receiver 3 also works to identify, for each of the frames, the location of the transmitter 2a-2d that has sent out the frame.

Figure 2B:
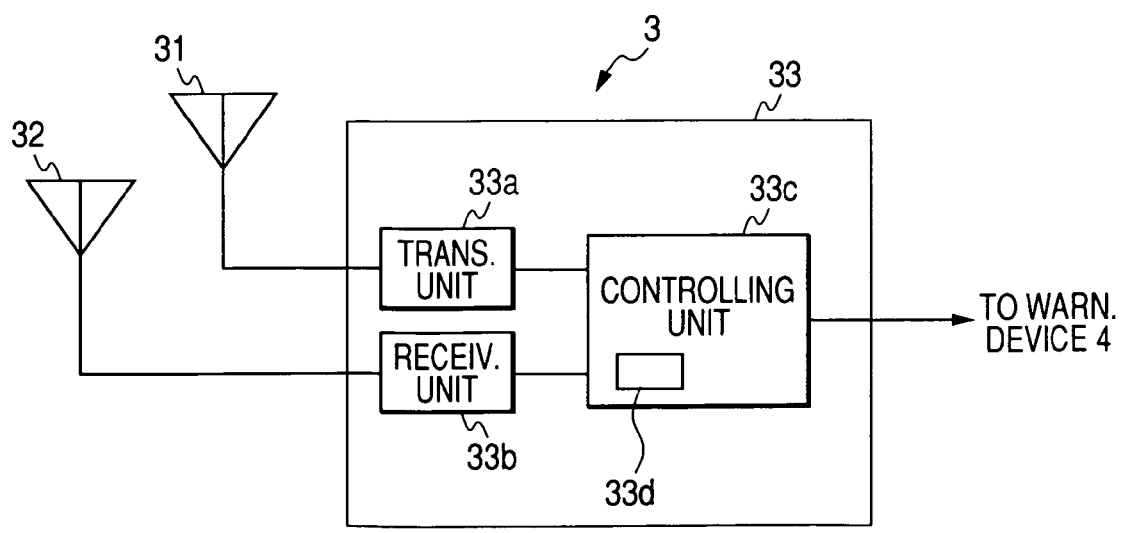
FIG. 2B is a block diagram showing the overall configuration of a receiver of the tire inflation pressure detecting apparatus of FIG. 1.

Referring to FIG. 2B, the receiver 3 is configured with a transmitting antenna 31, a receiving antenna 32, and a microcomputer 33.

In this embodiment, the transmitting antenna 31 is employed to transmit the trigger signal only to one of the four transmitters 2a-2d. The transmitting antenna 31 may be arranged in proximity to any of the four wheels 5a-5d to transmit the trigger signal only to the transmitter on that wheel. However, when the transmitting antenna 31 is arranged close to the front wheel 5a or 5b, the distance between the transmitting antenna 31 and the transmitter 2a or 2b will change due to steering of the vehicle 1, so that the trigger signal may not be reliably transmitted to that transmitter. Accordingly, to ensure reliable transmission of the trigger signal, it is preferable to arrange the transmitting antenna 31 close to the rear wheel 5c or 5d.

In this embodiment, as shown in FIG. 1, the transmitting antenna 31 is arranged in close proximity to the RL wheel 5d to transmit the trigger signal only to the transmitter 2d. In addition, an electromagnetic wave having a low frequency of, for example, about 125 kHz is used as the trigger signal.

The receiving antenna 32 is employed to receive all of the frames transmitted from the transmitters 2a-2d.

The microcomputer 33 is of a well-known type and functionally includes a transmitting unit 33a, a receiving unit 33b, and a controlling unit 33c. The microcomputer 33 is configured to implement predetermined processes, using data contained in the frames transmitted from the transmitters 2a-2d, in accordance with a program installed in a memory 33d of the controlling unit 33c.

In addition, in the memory 33d of the controlling unit 33c, there are stored reference ID signals, each of which coincides with the ID signal of one of the transmitters 2a-2d and is associated with the location of that transmitter 2a-2d (i.e., the wheel on which that transmitter 2a-2d is located).

The transmitting unit 33a works to transmit the trigger signal via the transmitting antenna 31.

The receiving unit 33b works to receive all of the frames transmitted from the transmitters 2a-2d via the receiving antenna 32 and provide those frames to the controlling unit 33c.

The controlling unit 33c works to determine, for each of the frames provided from the receiving unit 33b, the location of the transmitter 2a-2d having sent out that frame. The controlling unit 33b also works to determine the respective inflation pressures of the four tires based on the signals contained in the frames provided from the receiving unit 33b.

Consequently, the controlling unit 33b can detect the location as well as the inflation pressure of each of the four tires. Further, when the inflation pressure of any of the four tires is decreased to below a predetermined threshold, the controlling unit 33c works to output a warning signal indicative of the location and decreased inflation pressure of the tire.

The warning device 4 is arranged, as shown in FIG. 1, in a location visible for the driver of the vehicle 1. The warning device 4 is configured with, for example, a warning display. The warning device 4 works to inform, upon receiving the warning signal outputted from the controlling unit 33c, the driver of the location and decreased inflation pressure of the tire.

After having described the overall configuration of the tire inflation pressure detecting apparatus S1, a tire location detecting process thereof will be described hereinafter.

Figure 3:
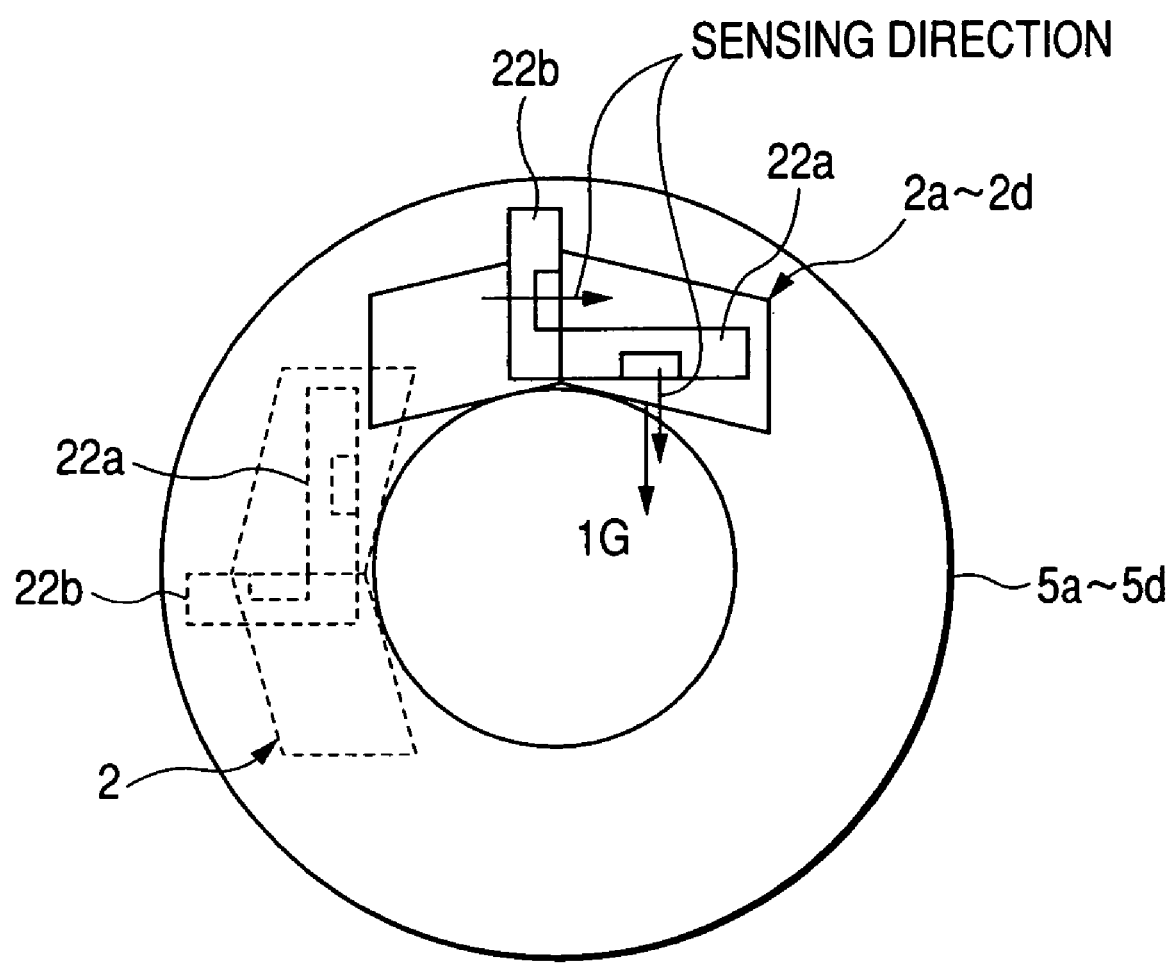
FIG. 3 is a schematic view illustrating the arrangement of two accelerometers of the transmitter of FIG. 2A on a vehicle wheel.

FIG. 3 shows an arrangement of the G sensors 22a and 22b of each of the transmitters 2a-2d on the corresponding wheel 5a-5d according to present embodiment. As shown in the figure, the G sensors 22a and 22b are so arranged to sense different accelerations. More specifically, the G sensor 22a works to sense the centrifugal acceleration of the wheel 5a-5d during rotation, while the G sensor 22b works to sense the tangential acceleration of the same.

FIGS. 4A1-4B2 illustrate the relationship between the rotation direction of the wheel 5a-5d and the acceleration signals outputted from the G sensors 22a and 22b.

The acceleration signal outputted from the G sensor 22a varies with rotation of the wheel 5a-5d, due to the change in the relationship between its sensing direction and the direction of gravity. More specially, the acceleration signal outputted from the G sensor 22a has the maximum value when the transmitter 2a-2d is at the highest position as indicated by solid lines in FIG. 3 and the minimum value when the transmitter 2a-2d is at the lowest position.

The acceleration signal outputted from the G sensor 22b also varies with rotation of the wheel 5a-5d, due to the same reason as above. More specially, the acceleration signal outputted from the G sensor 22b has the minimum value when the transmitter 2a-2d is at one middle position as indicated by dashed lines in FIG. 3 and the maximum value when the transmitter 2a-2d is at the other middle position (i.e., the most right position in FIG. 3).

Consequently, there exists a difference of 90° in phase between acceleration signals outputted from the G sensors 22a and 22b. More specifically, when the wheel 5a-5d rotates in the CCW direction as shown in FIG. 4A1, the acceleration signal outputted from the G sensor 22a lags that from the G sensor 22b as shown in FIG. 4A2. On the contrary, when the wheel 5a-5d rotates in the CW direction as shown in FIG. 4B1, the acceleration signal outputted from the G sensor 22a leads that from the G sensor 22b as shown in FIG. 4B2.

Based on the lead/lag relationship between the acceleration signals outputted from the G sensors 22a and 22b, the controlling unit 23a of the transmitter 2a-2d determines the rotation direction of the corresponding wheel 5a-5d and assembles into the frame the rotation direction signal representative of the determined rotation direction.

On the other hand, upon receiving the frame transmitted from the transmitter 2a-2d, the receiver 3 determines whether the transmitter 2a-2d is mounted on one of the right-side wheels 5a and 5c or one of the left-side wheels 5b and 5d based on the rotation direction signal contained in the frame.

In addition, since the acceleration signals outputted from the G sensors 22a and 22b are constant when the vehicle 1 stands still, it is also possible to determine whether the vehicle 1 is running or stands still based on the acceleration signals.

Figure 5:
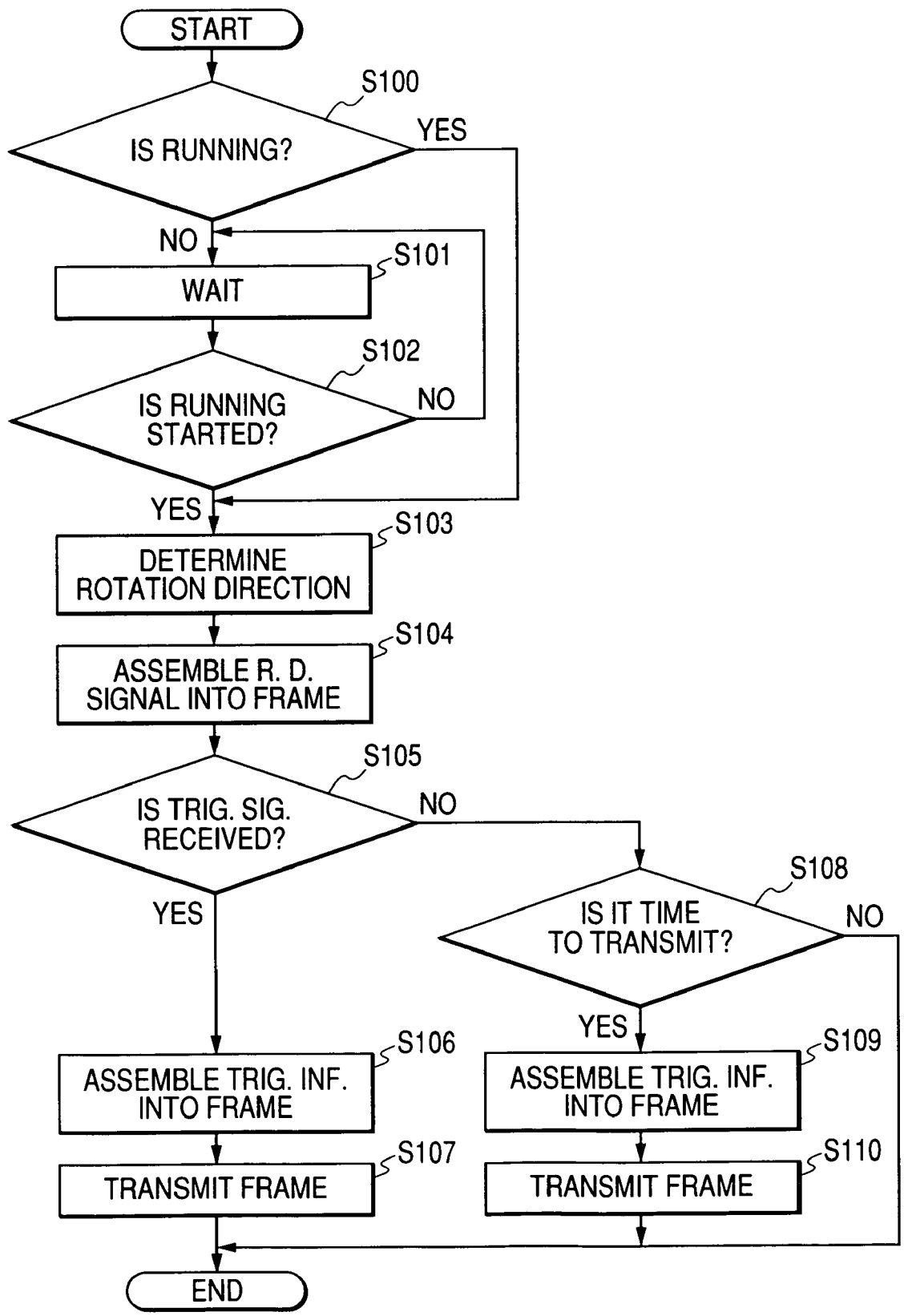
FIG. 5 is a flow chart showing a process of a controlling unit of the transmitter of FIG. 2A according to the first embodiment.

FIG. 5 shows the process of the controlling unit 23a of each of the transmitters 2a-2d for tire location detection.

First, as indicated at the step S100, the controlling unit 23a determines whether or not the vehicle 1 is running based on the acceleration signals outputted from the G sensors 22a and 22b.

If the above determination yields a "YES" answer, then the process proceeds to the step S103.

Otherwise, if the determination yields a "NO" answer, then the controlling unit 23a waits for a predetermined time, as indicated at the step S101.

After passage of the predetermined time, the controlling unit 23a checks whether or not running of the vehicle 1 is started based on the acceleration signals from the G sensors 22a and 22b, as indicated at the step S102.

If the vehicle 1 yet stands still, then the process returns to the step S101.

Otherwise, if the vehicle 1 has started to run, then the controlling unit 23a determines the rotation direction of the wheel 5a-5d, on which the controlling unit 23a is mounted, based on the acceleration signals from the G sensors 22a and 22b, as indicated at the step S103.

At the step S104, the controlling unit 23a assembles the rotation direction signal representative of the above-determined rotation direction into the frame in which signals outputted from the sensing unit 21 are contained.

At the step S105, the controlling unit 23a makes a determination as to whether the trigger signal from the receiver 3 is received by the transmitting/receiving unit 23b.

If the determination at the step S105 yields a "YES" answer, then the controlling unit 23a assembles into the frame the trigger information indicative of the presence of reception of the trigger signal, as indicated at the step S106.

After that, the controlling unit 23a provides the frame to the transmitting/receiving unit 23b to transmit the frame to the receiver 3, as indicated at the step S107.

Otherwise, if the determination at the step S105 yields a "NO" answer, then the controlling unit 23a makes a further determination as to whether it is time to periodically transmit the frame to the receiver 3, as indicated at the step S108.

If the further determination yields a "YES" answer, then the controlling unit 23a assembles into the frame the trigger information indicative of the absence of reception of the trigger signal, as indicated at the step S109.

After that, the controlling unit 23a provides the frame to the transmitting/receiving unit 23b to transmit the frame to the receiver 3, as indicated at the step S110.

Otherwise, if the determination at the step S110 yields a "NO" answer, then the process skips the steps 109 and 110 and directly goes to the end without transmitting the frame to the receiver 3.

FIGS. 6A-6G illustrate examples of tire rotation, to which the tire inflation pressure detecting apparatus S1 according to the present embodiment can be applied.

Figure 6A:
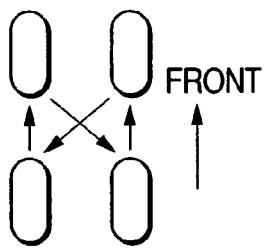
FIGS. 6A-6G are schematic views illustrating examples of tire rotation, to which the tire inflation pressure detecting apparatus of FIG. 1 according to the first embodiment can be applied.
Figure 6B:
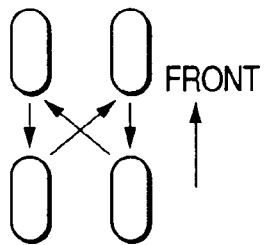
Figure 6C:
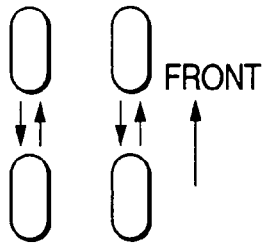
Figure 6D:
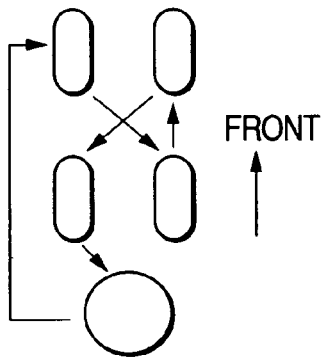
Figure 6E:
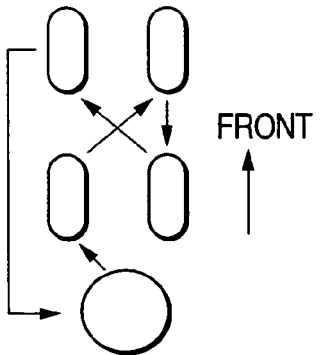
Figure 6F:
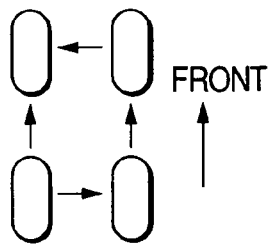
Figure 6G:
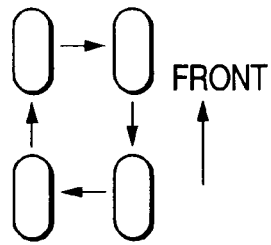

Among them, the first to fifth examples shown in FIGS. 6A to 6E are generally used ones. More specifically, the first example shown in FIG. 6A is mainly used for FR vehicles; the second one shown in FIG. 6B is mainly used for FF vehicles; the third one shown in FIG. 6C is mainly used for vehicles with tires rotatable only in one direction; the fourth one shown in FIG. 6D is mainly used for FR vehicles with a standard spare tire; the fifth one shown in FIG. 6E is mainly used for FF vehicles with a standard spare tire. On the other hand, the sixth and seventh examples shown in FIGS. 6F and 6G are not generally used ones, but are given only for the purpose of illustration.

Figure 7A:
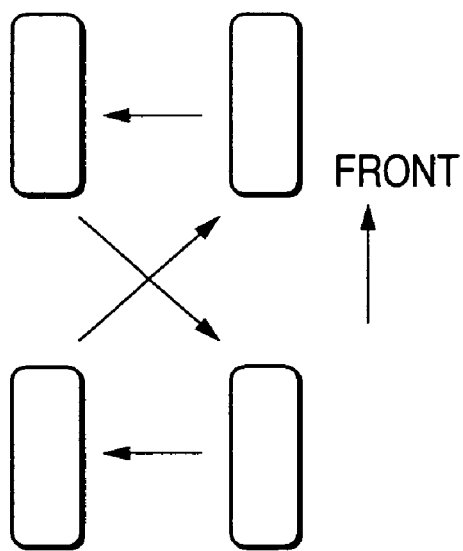
FIGS. 7A-7C are schematic views illustrating examples of tire rotation, to which the tire inflation pressure detecting apparatus of FIG. 1 according to the first embodiment cannot be applied.
Figure 7B:
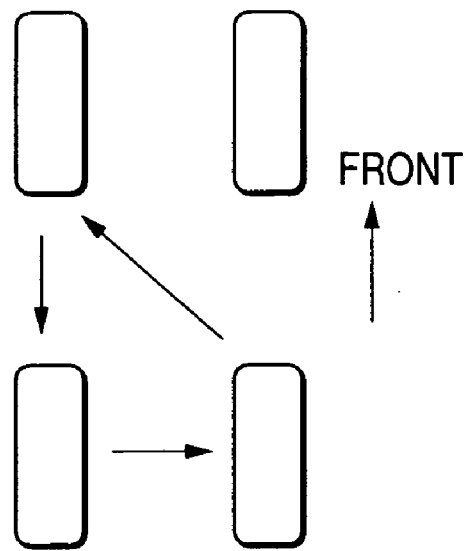
Figure 7C:
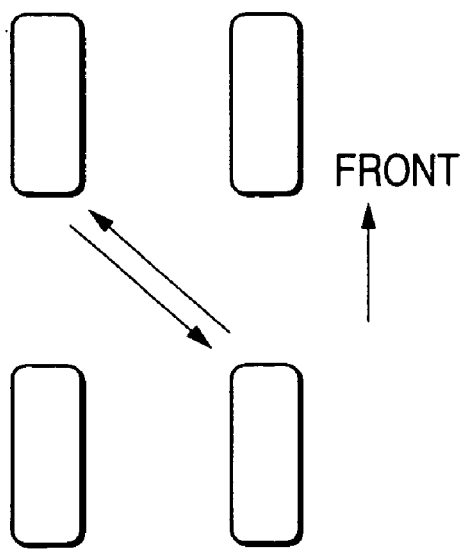

FIGS. 7A-7C illustrate examples of tire rotation, to which the tire inflation pressure detecting apparatus S1 according to the present embodiment cannot be applied.

In the example shown in FIG. 7A, the right-side wheels are counterchanged with the left-side wheels such that one of the front-side wheels is shifted to the rear side while the other remains on the front side. In the example shown in FIG. 7B, the tire rotation is performed among three wheels, keeping the other one at the original location. In the example shown in FIG. 7C, the tire rotation is performed only between two wheels, keeping the other two at the original locations. All of those examples shown in FIGS. 7A-7C are unlikely to be used in practice, but it is recommended to explicitly specify in manuals that the tire inflation pressure detecting apparatus S1 according to the present embodiment is ineffective in those cases.

Figure 8:
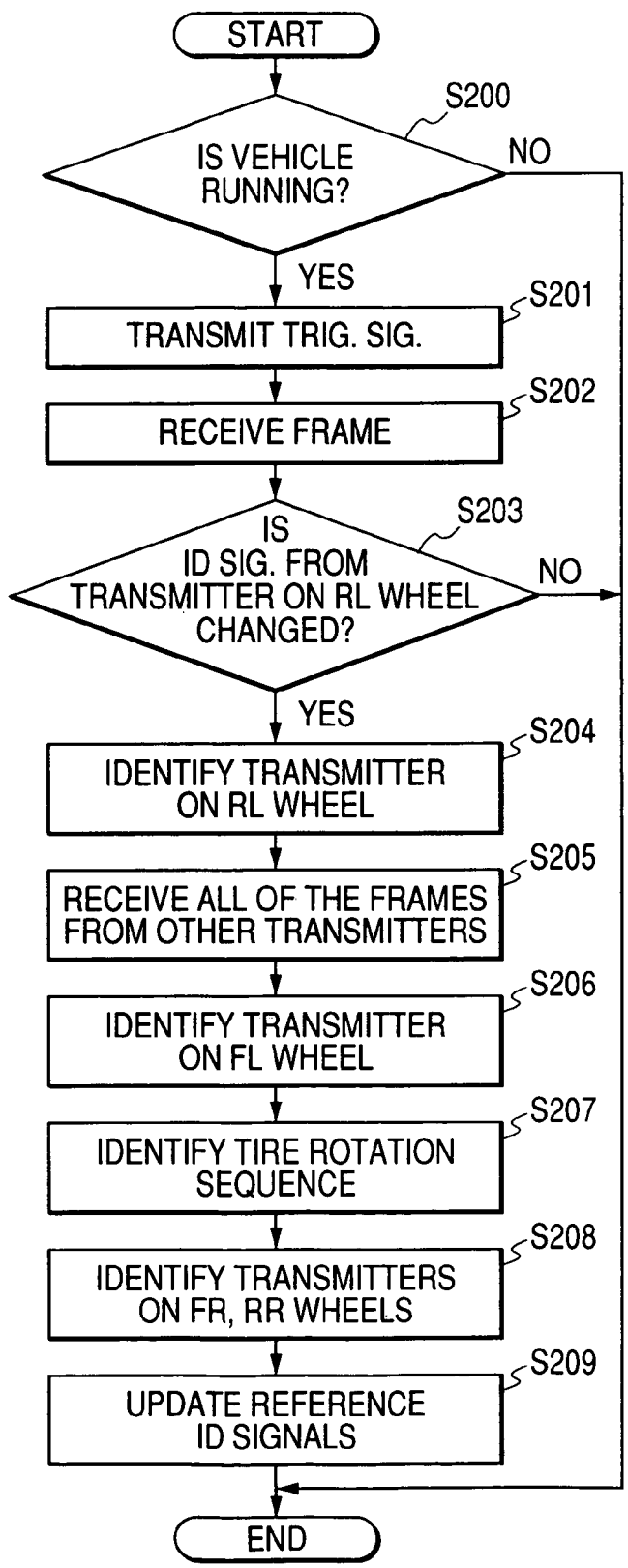
FIG. 8 is a flow chart showing a process of a controlling unit of the receiver of FIG. 2B according to the first embodiment.

FIG. 8 is a flow chart showing the process of the controlling unit 33c of the receiver 3 for tire location detection. FIGS. 9A-9D are schematic views illustrating steps of the tire location detection by the controlling unit 33c.

Figure 9A:
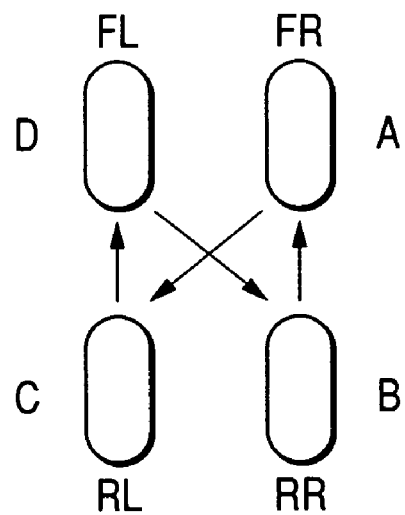
FIGS. 9A-9D are schematic views illustrating the steps of tire location detection by the controlling unit of the receiver of FIG. 2 according to the first embodiment.

FIG. 9A shows the locations of the four tires before the tire rotation. For convenience, the ID signal specific to the transmitter mounted on the FR wheel 5a before the tire rotation is referred to as ID signal A, that specific to the transmitter mounted on the RR wheel 5c before the tire rotation is referred to as ID signal B, that specific to the transmitter mounted on the RL wheel before the tire rotation is referred to as ID signal C, and that specific to the transmitter mounted on the FL wheel before the tire rotation is referred to as ID signal D. In addition, before the tire rotation, there are stored in the memory 33d of the controlling unit 33c the reference ID signals, each of which coincides with one of the ID signals A-D and is associated with the location of the transmitter whose ID signal coincides therewith.

Referring to FIG. 8, the controlling unit 33c first determines whether or not the vehicle 1 is running, as indicated at the step S200.

If the above determination yields a "NO" answer, then the process directly goes to the end.

Otherwise, if the vehicle 1 is running, the controlling unit 33c transmits the trigger signal via the transmitting antenna 31 toward the RL wheel 5d, as indicated at the step S201.

At the step S202, the controlling unit 33c receives the frame that is transmitted by the transmitter on the RL wheel 5d in response to the trigger signal.

Then, the controlling unit 33c checks whether or not the ID signal contained in the received frame coincides with the reference ID signal that is coincident with the ID signal C. In short, the controlling unit 33c checks whether or not the ID signal transmitted from the transmitter on the RL wheel 5d is changed from the ID signal C, as indicated at the step S203.

If the above determination at the step S203 yields a "NO" answer, then the controlling unit 33c recognizes that no tire rotation has been made and the process directly goes to the end.

Figure 9B:
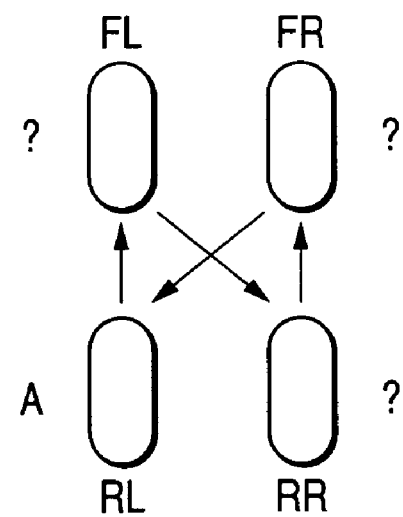

Otherwise, if the determination at the step S203 yields a "YES" answer, then the controlling unit 33c recognizes that the tire rotation has been made and identifies the transmitter and the tire currently on the RL wheel 5d, as indicated at the step S204. Here, suppose that the ID signal specific to the transmitter on the RL wheel 5d is changed from the ID signal C to the ID signal A, as shown in FIG. 9B.

At the step S205, the controlling unit 33c receives all of the frames which are periodically transmitted from the transmitters on the other three wheels 5a-5c.

At the step S206, the controlling unit 33c determines, for each of the frames received from the four transmitters, whether the transmitter having sent out the frame is currently on one of the right-side wheels 5a and 5c or one of the left-side wheels 5b and 5d based on the rotation direction signal contained in the frame.

Since the transmitter currently on the RL wheel 5d has been identified, the controlling unit 33c recognizes that the other transmitter determined as being currently on one of the left-side wheels 5b and 5d is on the FL wheel 5b.

Figure 9C:
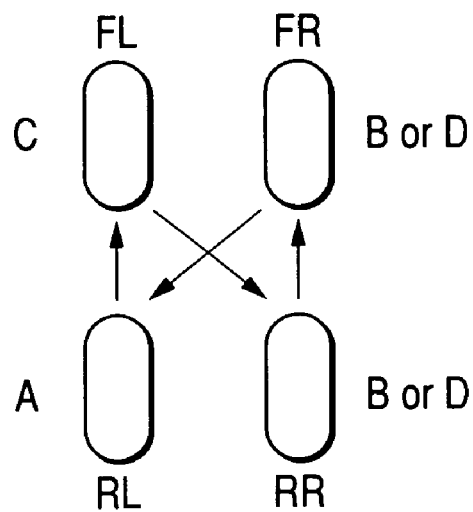
Figure 9D:
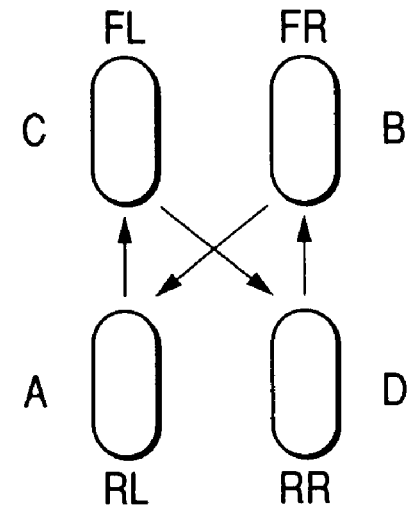

Consequently, the transmitter and the tire currently on the FL wheel 5b are identified by the controlling unit 33c, as indicated at the step S206. Here, suppose that the ID signal specific to the transmitter on the FL wheel 5b is changed from the ID signal D to the ID signal C, as shown in FIG. 9C.

Further, the controlling unit 33c retrieves the reference ID signals stored in the memory 33d and determines, through comparison of those reference ID signals with the ID signals currently associated with the left-side wheels 5b and 5d (i.e., C and A), that the tire rotation has been made in the sequence shown in FIG. 6A, as indicated at the step S207.

After that, the controlling unit 33c compares the ID signals transmitted from the transmitters determined as being currently on the right-side wheels 5a and 5c with the two reference ID signals associated with the right-side wheels 5a and 5c and identifies one of the ID signals which coincides with one of the two reference ID signals as the ID signal B and the other as the ID signal D. Then, in view of the sequence of tire rotation shown in FIG. 6A, the controlling unit 33c recognizes that the transmitter whose ID signal is identified as B is currently on the FR wheel 5a and the transmitter whose ID signal is identified as D is currently on the RR wheel 5c.

Consequently, the transmitters and tires currently on the FR wheel 5a and RR wheel 5c are identified by the controlling unit 33c, as indicated at the step S208.

Finally, the controlling unit 33c updates the reference ID signals in the memory 33d through associating the ID signals and the current locations of the four transmitters, as indicated at the step S209.

Through performing the above-described process, it is possible for the receiver 3 to automatically detect the locations of the transmitters 2a-2d and thus those of the associated tires even when the locations of the tires have been changed due to a tire rotation.

Further, through automatically detecting the new locations of the transmitters 2a-2d after the tire rotation, it is possible for the receiver 3 to automatically re-register therein the ID signals specific to the transmitters 2a-2d.

In addition, through performing the above-described process, it is possible for the receiver 3 to quickly detect the locations of the transmitters 2a-2d and thus those of the associated tires immediately after a start of running of the vehicle 1.

Moreover, the receive 3 necessitates only a single transmitting antenna 31 to transmit the trigger signal to one of the transmitters 2a-2d, thus simplifying the configuration and reducing the manufacturing cost of the tire inflation pressure detecting apparatus S1.

Second Embodiment

In this embodiment, a tire inflation pressure detecting apparatus S2 is provided which has almost the same configuration as the tire inflation pressure detecting apparatus S1 according to the previous embodiment. Accordingly, only the differences therebetween will be described below.

Figure 10:
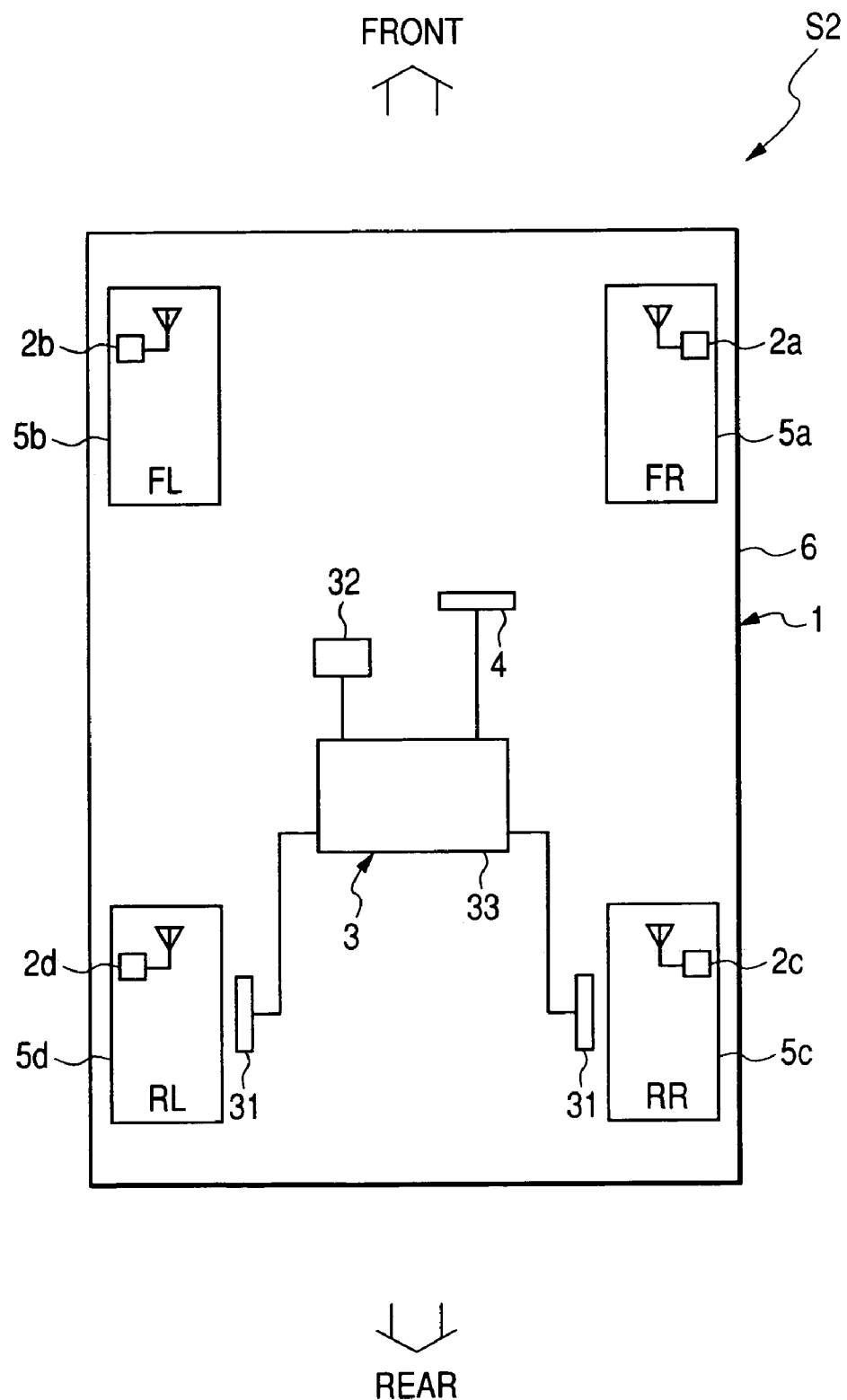
FIG. 10 is a schematic view illustrating the overall configuration of a tire inflation pressure detecting apparatus according to the second embodiment of the invention.

FIG. 10 shows the overall configuration of the tire inflation pressure detecting apparatus S2. As shown in the figure, in this embodiment, the number of the transmitting antennas 31 of the receiver 3 is two, instead of one as in the previous embodiment. The two transmitting antennas 31 are arranged close to the RR wheel 5c and the RL wheel 5d, respectively.

With the above configuration, the receiver 3 detects the locations of the transmitters in the following way.

First, the receiver 3 transmits the trigger signals toward the RR wheel 5c and the RL wheel 5d via the respective transmitting antennas 31.

Secondly, the receiver 3 identifies the two transmitters on the RR wheel 5c and the RL wheel 5d, upon receiving the frames transmitted from them in response to the trigger signals.

Thirdly, the receiver 3 receives the frames that are periodically transmitted from the transmitters on the front-side wheels 5a and 5b.

Fourthly, the receiver 3 determines, for each of the frames transmitted from the four transmitters, whether the transmitter having sent out the frame is mounted on one of the right-side wheels 5a and 5c or one of the left-side wheels 5b and 5d, based on the rotation direction signal contained in the frame.

Fifthly, since the transmitter on the RR wheel 5c has been identified, the receiver 3 recognizes that the other transmitter determined as being on one of the right-side wheels 5a and 5c is on the FR wheel 5a. Thus, the transmitter on the FR wheel 5a is identified. Similarly, since the transmitter on the RL wheel 5d has been identified, the receiver 3 recognizes that the other transmitter determined as being on one of the left-side wheels 5b and 5d is on the FL wheel 5b. Thus, the transmitter on the FR wheel 5a is identified.

Consequently, the locations of the transmitters and thus those of the associated tires are detected by the receiver 3.

The above-described tire inflation pressure detecting apparatus S2 has the same advantages as the tire inflation pressure detecting apparatus S1 described in the previous embodiment.

In addition, in the tire inflation pressure detecting apparatus S2, the receiver 3 can automatically detect the new locations of the transmitters after a tire rotation without identifying the sequence of the tire rotation, thus simplifying the tire location detection process.

Third Embodiment

In this embodiment, a tire inflation pressure detecting apparatus S3 is provided which has almost the same configuration as the tire inflation pressure detecting apparatus S2 according to the previous embodiment. Accordingly, only the differences therebetween will be described below.

Figure 11:
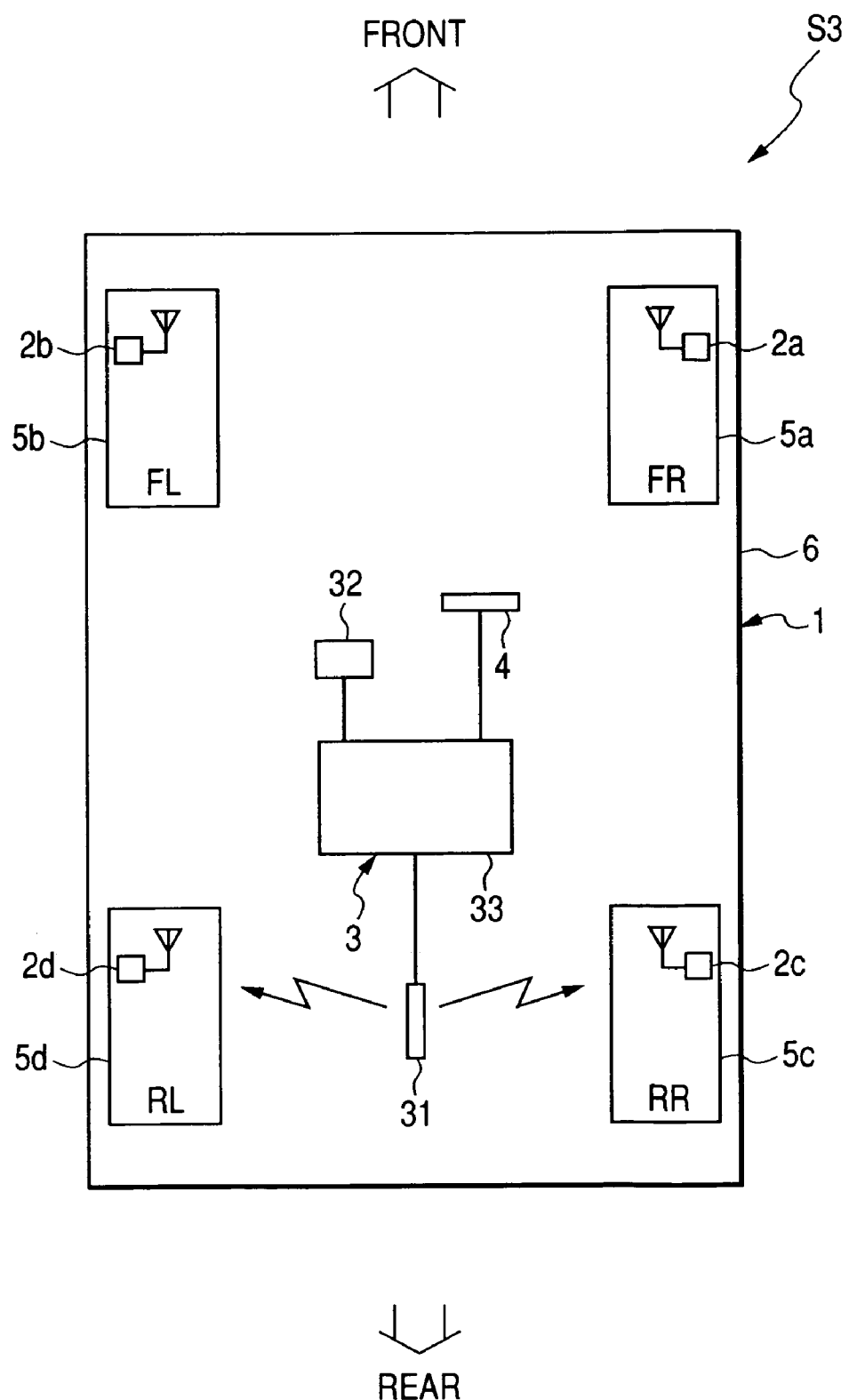
FIG. 11 is a schematic view illustrating the overall configuration of a tire inflation pressure detecting apparatus according to the third, fourth, or fifth embodiments of the invention.

FIG. 11 shows the overall configuration of the tire inflation pressure detecting apparatus S3. As shown in the figure, in this embodiment, the receiver 3 includes only a single transmitting antenna 31 that is arranged in the middle position between the two rear-side wheels 5c and 5d to transmit the trigger signal to both the transmitters on the wheels 5c and 5d.

With the above configuration, since the trigger signal is transmitted from the single transmitting antenna 31 to both the transmitters on the wheels 5c and 5d, crosstalk of signals may occur at the receiver 3 when the receiver 3 receives the frames that are transmitted from the two transmitters in response to the trigger signal.

To avoid such crosstalk of signals, in this embodiment, the two transmitters on the wheels 5c and 5d are so configured to transmit the respective frames at different times.

Figure 12:
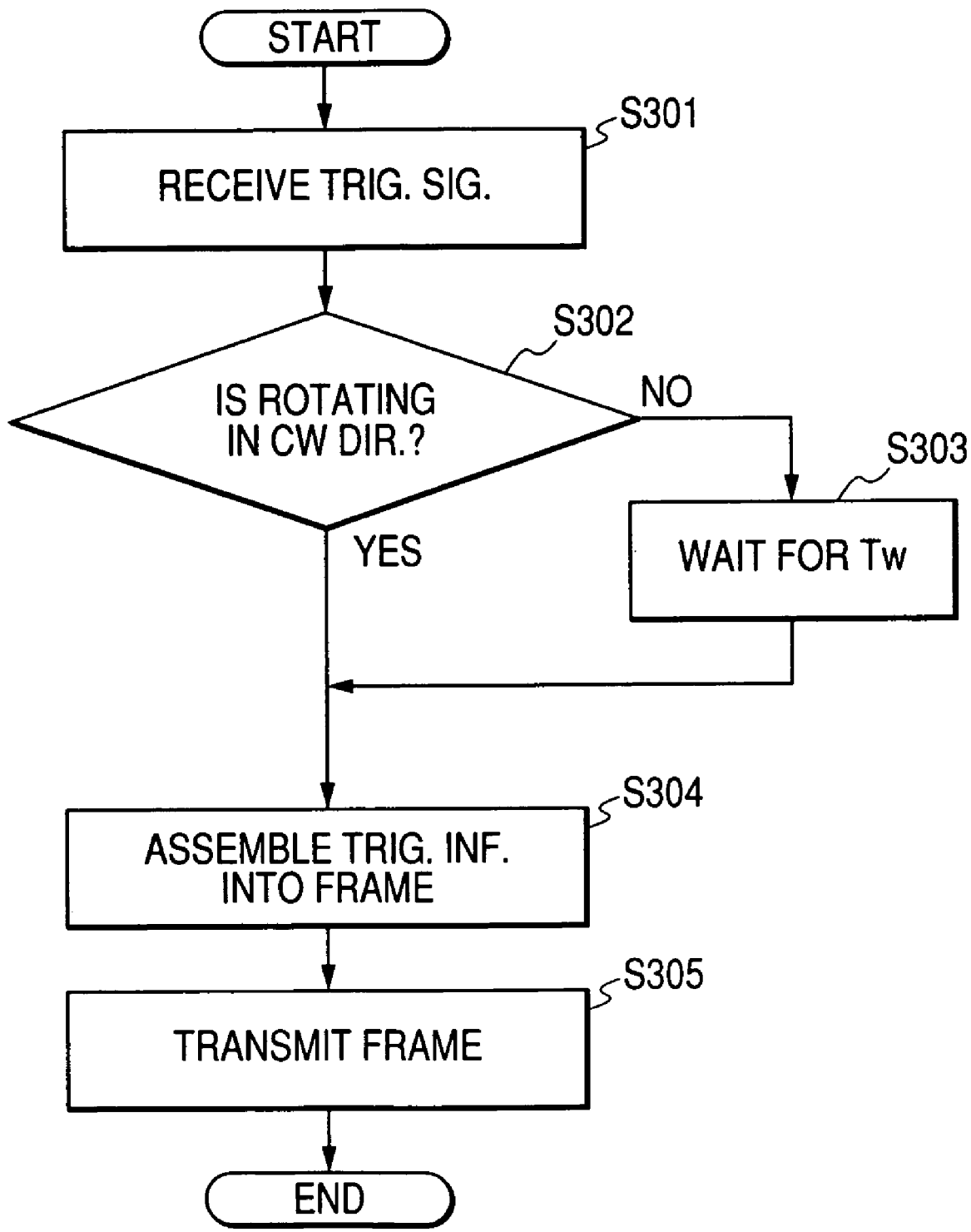
FIG. 12 is a flow chart showing a process of a controlling unit of a transmitter in the tire inflation pressure detecting apparatus of FIG. 11 according to the third embodiment.

FIG. 12 is a flow chart illustrating the process of the controlling unit 23a of each of the transmitters for transmitting the frame in response to the trigger signal.

It should be noted that the process shown in FIG. 12 can be considered as part of the process of the controlling unit 23a for tire location detection as shown in FIG. 5.

First, the controlling unit 23a receives the trigger signal transmitted from the transmitting antenna 31 via the transmitting/receiving unit 23b, as indicated at the step S301.

Then, the controlling unit 23a determines whether or not the wheel on which the controlling unit 23a is mounted rotates in the CW direction based on the rotation direction signal contained in the frame, as indicated in the step S302.

If the above determination yields a "YES" answer, the process proceeds to the step S304.

Otherwise, if the above determination yields a "NO" answer, in other words, if the wheel rotates in the CCW direction, then the controlling unit 23a waits for a predetermined time Tw, as indicated at the step S303. To avoid cross talk of signals at the receiver 3, the waiting time Tw is predetermined to be longer than the transmission time Ttf required to transmit the frame from the transmitter to the receiver 3.

At the step S304, the controlling unit 23a assembles into the frame the trigger information indicative of the presence of reception of the trigger signal.

Then, the controlling unit 23a provides the frame to the transmitting/receiving unit 23b to transmit the frame to the receiver 3, as indicated at the step S305.

Figure 13:
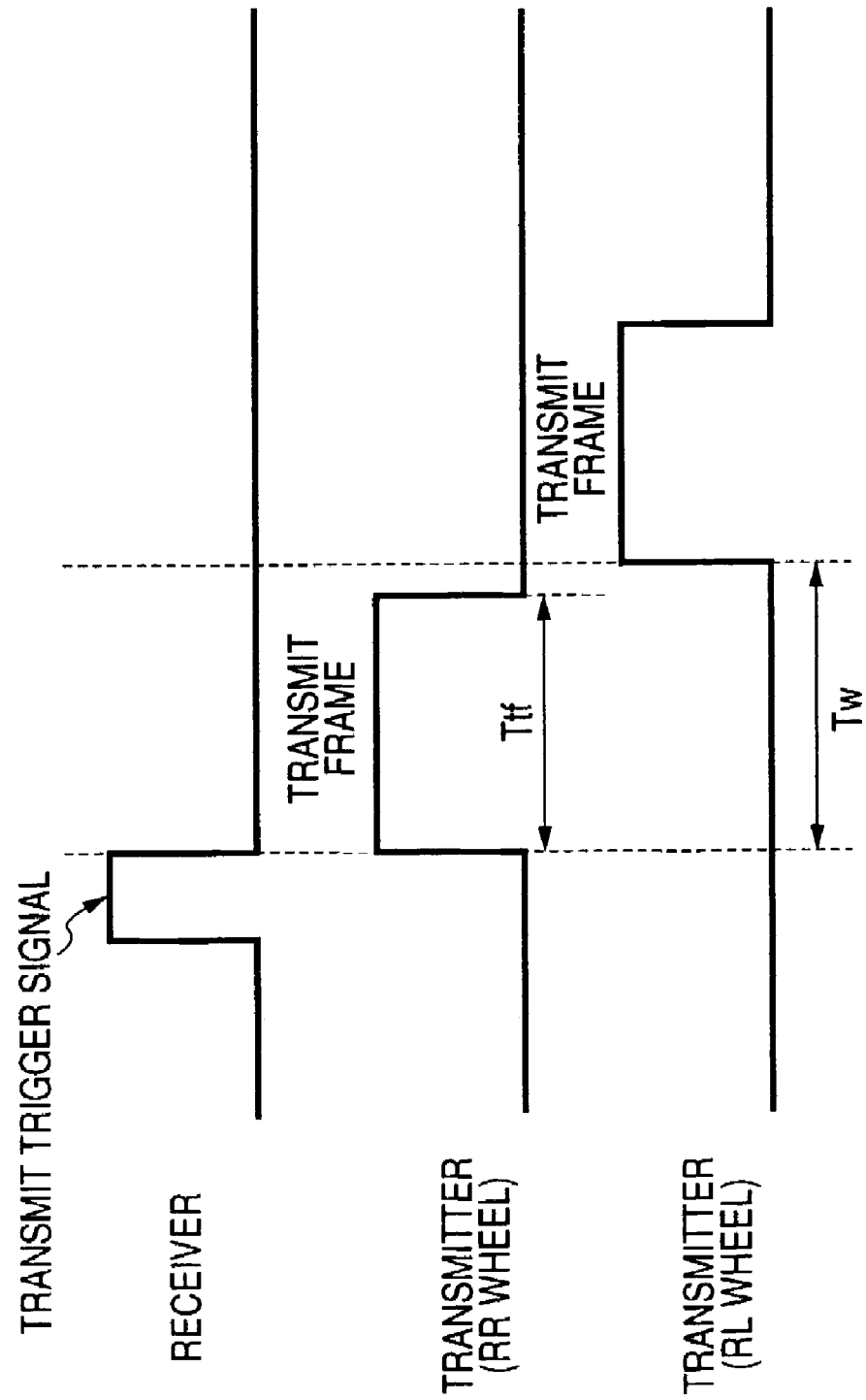
FIG. 13 is a time chart illustrating the transmissions of frames by two transmitters in response to a trigger signal from a receiver in the tire inflation pressure detecting apparatus of FIG. 11 according to the third embodiment.

FIG. 13 is a time chart illustrating the transmissions of frames by the transmitters on the wheels 5c and 5d in accordance with the above-described process.

As shown in FIG. 13, the transmitter on the RR wheel 5c transmits the frame immediately after the sending out of the trigger signal by the receiver 3 and it takes Ttf to complete the transmission.

In comparison, the transmitter on the RL wheel 5d transmits the frame after Tw from the sending out of the trigger signal by the receiver 3.

Since Ttf is shorter-than Tw, the transmissions of frames by the two transmitters are carried out at different times without overlapping each other, thereby avoiding crosstalk of signals at the receiver 3.

With the above configuration, in this embodiment, the receiver 3 detects the locations of the transmitters in the following way.

First, the receiver 3 transmits the trigger signal via the transmitting antenna 31.

Secondly, the receiver 3 identifies the two transmitters on the RR wheel 5c and the RL wheel 5d, upon receiving the frames that are transmitted from them at different times in response to the trigger signal.

Thirdly, the receiver 3 receives the frames that are periodically transmitted from the transmitters on the front-side wheels 5a and 5b.

Fourthly, the receiver 3 determines, for each of the frames transmitted from the four transmitters, whether the transmitter having sent out the frame is mounted on one of the right-side wheels 5a and 5c or one of the left-side wheels 5b and 5d, based on the rotation direction signal contained in the frame.

Fifthly, since the transmitter on the RR wheel 5c has been identified, the receiver 3 recognizes that the other transmitter determined as being on one of the right-side wheels 5a and 5c is on the FR wheel 5a. Thus, the transmitter on the FR wheel 5a is identified. Similarly, since the transmitter on the RL wheel 5d has been identified, the receiver 3 recognizes that the other transmitter determined as being on one of the left-side wheels 5b and 5d is on the FL wheel 5b. Thus, the transmitter on the FR wheel 5a is identified.

Consequently, the locations of the transmitters and thus those of the associated tires are detected by the receiver 3.

The above-described tire inflation pressure detecting apparatus S3 has the same advantages as the tire inflation pressure detecting apparatus S2 according to the previous embodiment.

In addition, compared to the tire inflation pressure detecting apparatus S2, the tire inflation pressure detecting apparatus S3 necessitates only a single transmitting antenna 31, thereby simplifying the configuration thereof.

Fourth Embodiment

In this embodiment, a tire inflation pressure detecting apparatus S4 is provided which has the same configuration as the tire inflation pressure detecting apparatus S3 according to the previous embodiment. Accordingly, only the differences in operation therebetween will be described below.

Figure 14:
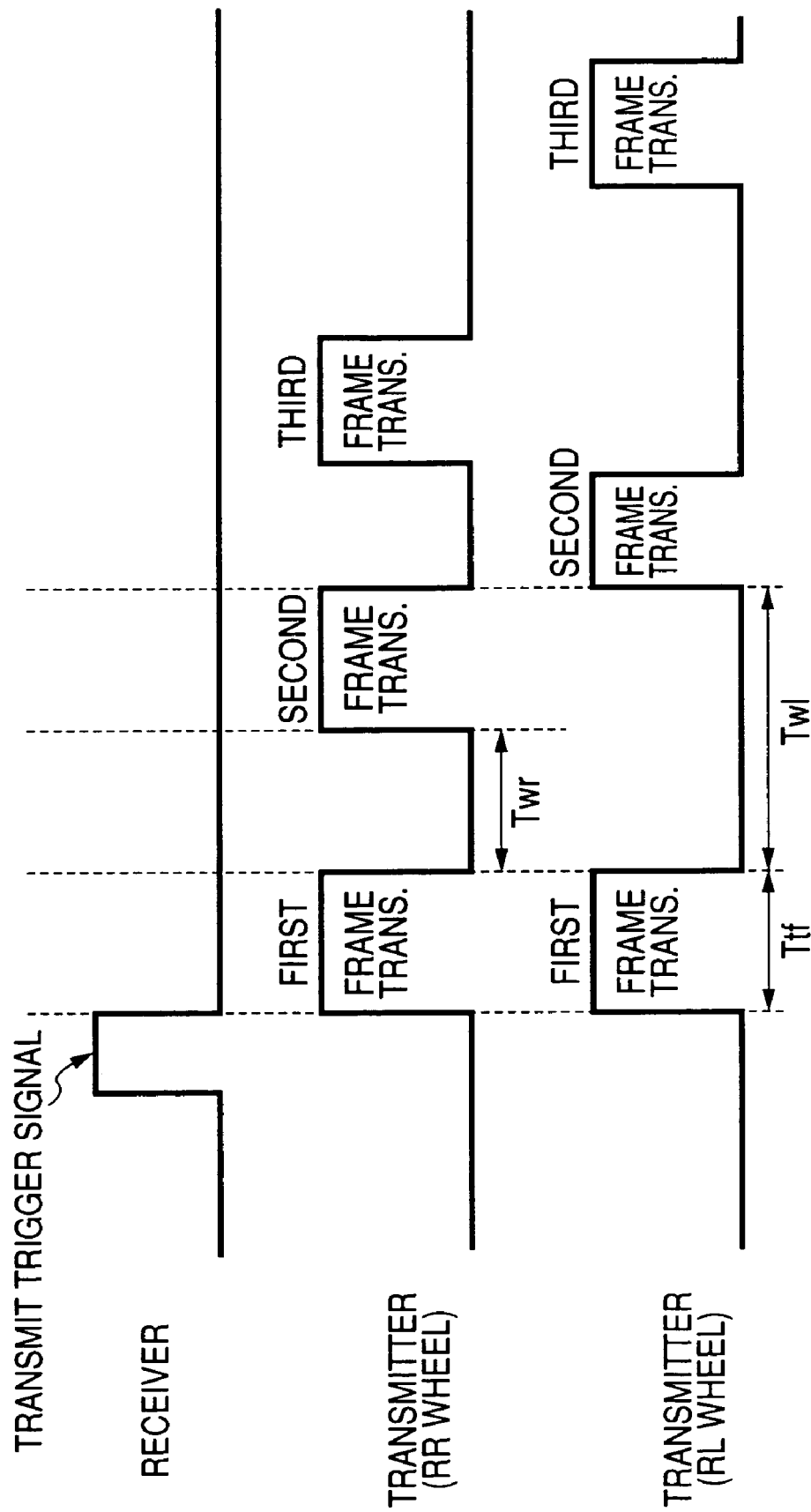
FIG. 14 is a time chart illustrating the transmissions of frames by two transmitters in response to a trigger signal from a receiver in the tire inflation pressure detecting apparatus of FIG. 11 according to the fourth embodiment.

FIG. 14 is a time chart illustrating the transmissions of frames by the transmitters on the rear-side wheels 5c and 5d according to the present embodiment.

As shown in FIG. 14, in this embodiment, both the transmitters on the wheels 5c and 5d transmit the respective frames immediately after the sending out of the trigger signal by the receiver 3 a plurality of times. However, the time intervals Twr between successive transmissions by the transmitter on the RR wheel 5c are different from the time intervals Twl between successive transmissions by the transmitter on the RL wheel 5d.

Moreover, there are specified the following relationships:

$Twr > Ttf$, and $Twl > Ttf + Twr$, where, Ttf is the time required to complete one transmission of the frame.

With the above operation, the first transmissions of the frames from the two transmitters on the wheels 5c and 5d are made at the same time and thus may cause crosstalk of signals at the receiver 3. However, the succeeding transmissions of the frame from one of the two transmitters will not overlap those of the frame from the other, so that further crosstalk of signals at the receiver 3 can be avoided and thus the receiver 3 can reliably receive the frames from the two transmitters.

The above-described tire inflation pressure detecting apparatus S4 has the same advantages as the tire inflation pressure detecting apparatus S3 according to the previous embodiment.

Fifth Embodiment

In this embodiment, a tire inflation pressure detecting apparatus S5 is provided which has the same configuration as the tire inflation pressure detecting apparatus S3 according to the third embodiment. Accordingly, only the differences in operation therebetween will be described below.

Figure 15:
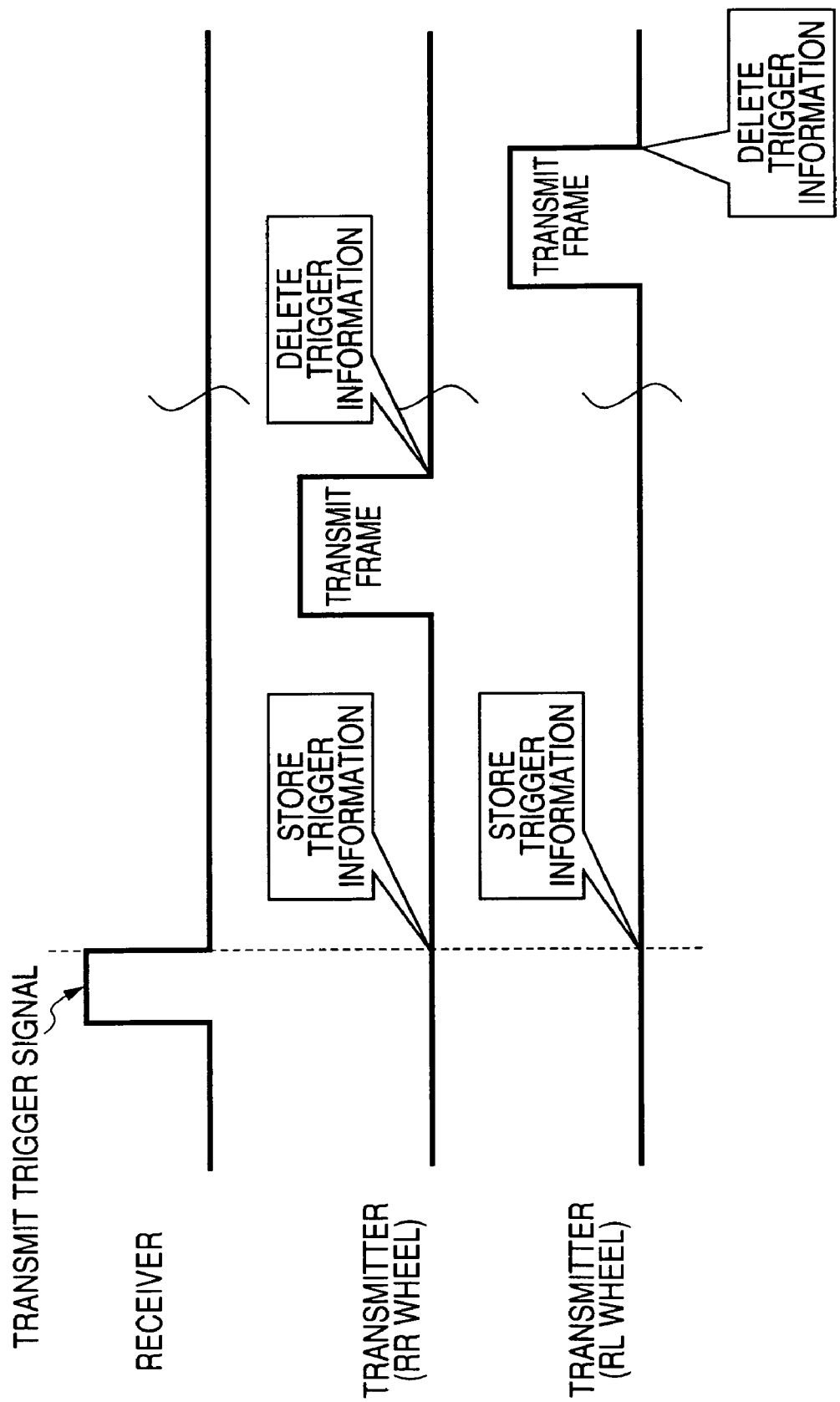
FIG. 15 is a time chart illustrating the transmissions of frames by two transmitters in response to a trigger signal from a receiver in the tire inflation pressure detecting apparatus of FIG. 11 according to the fifth embodiment.

FIG. 15 is a time chart illustrating the transmissions of frames by the transmitters on the rear-side wheels 5c and 5d according to the present embodiment.

As shown in FIG. 15, in this embodiment, both the transmitters on the rear-side wheels 5c and 5d do not transmit the respective frames in response to the trigger signal transmitted from the receiver 3.

Instead, upon receiving the trigger signal, the transmitters on the rear-side wheels 5c and 5d temporarily store the trigger information indicative of the presence of reception of the trigger signal in the memory 23c thereof. When it is time for each of the transmitters to periodically transmit the frame, the transmitter assembles the trigger information stored in the memory 23c into the frame and transmits it. After that, the trigger information is deleted form the memory 23c.

With the above operation, the receiver 3 can determine, for each of the frames transmitted from the four transmitters, whether or not the transmitter having sent out the frame is on one of the rear-side wheels 5c and 5d based on the trigger information contained in the frame.

Further, the receiver 3 can determine, for each of the frames transmitted from the four transmitters, whether the transmitter having sent out the frame is on one of the right-side wheels 5a and 5c or one of the left-side wheels 5b and 5d based on the rotation direction signal contained in the frame.

Consequently, the receiver 3 can identify, for each of the frames, the transmitter that has sent out the frame.

The above-described tire inflation pressure detecting apparatus S5 has the same advantages as the tire inflation pressure detecting apparatus S3 according to the third embodiment.

Sixth Embodiment

In this embodiment, a tire inflation pressure detecting apparatus S6 is provided which has almost the same configuration as the tire inflation pressure detecting apparatus S3 according to the third embodiment. Accordingly, only the differences therebetween will be described below.

Figure 16:
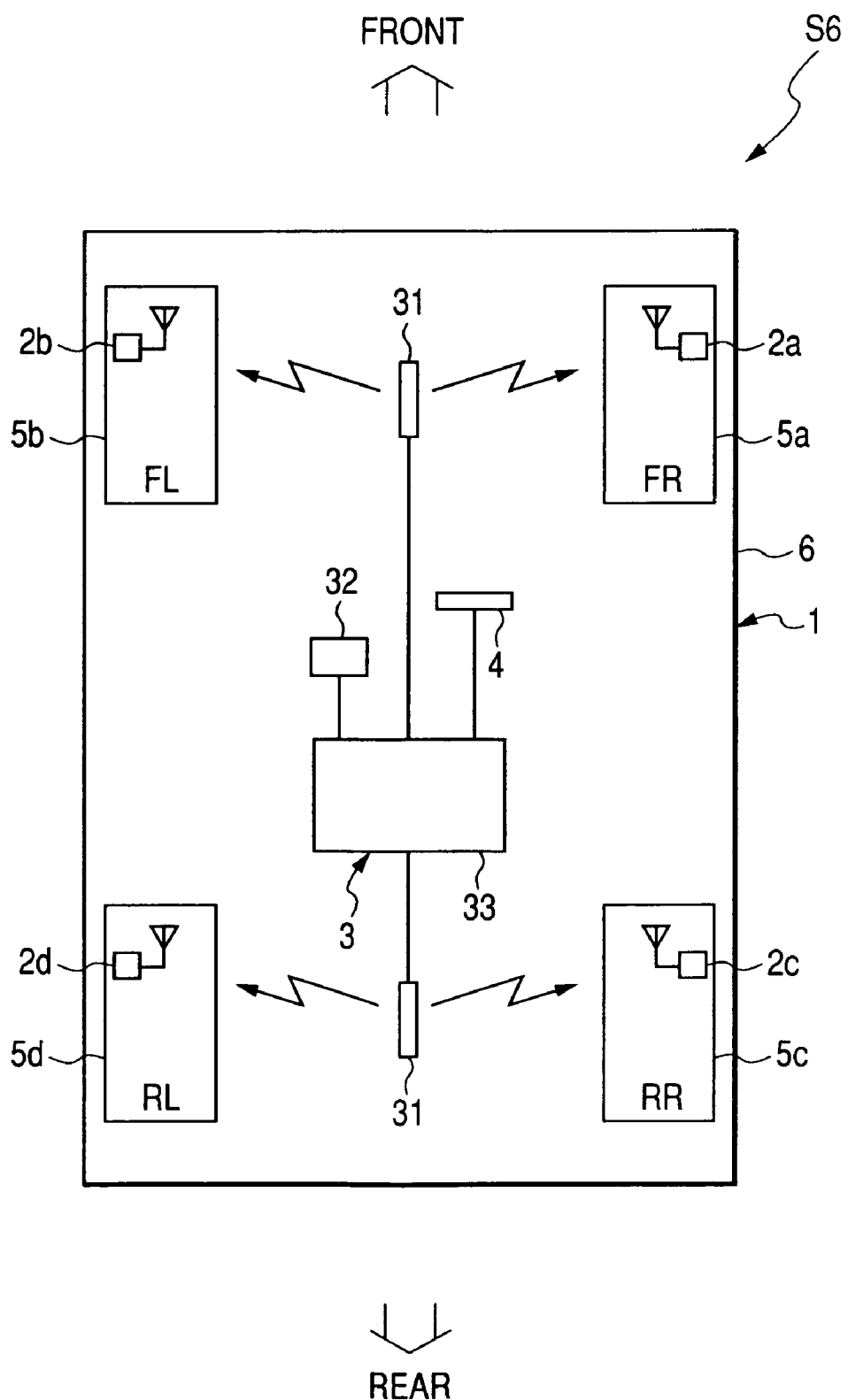
FIG. 16 is a schematic view illustrating the overall configuration of a tire inflation pressure detecting apparatus according to the sixth embodiment of the invention.

FIG. 16 shows the overall configuration of the tire inflation pressure detecting apparatus S6. As shown in the figure, in this embodiment, the receiver 3 includes two transmitting antennas 31, one of which is arranged in the middle position between the front-side wheels 5a and 5b while the other is arranged in the middle position between the rear-side wheels 5c and 5d.

With the above configuration, the receiver 3 may transmit the trigger signal via the front-side transmitting antenna 31 to both the front-side wheels 5a or 5b while holding the rear-side transmitting antenna 31 in standby mode. On the contrary, the receiver 3 may transmit the trigger signal via the rear-side transmitting antenna 31 to both the rear-side wheels 5c and 5d while holding the front-side transmitting antenna 31 in standby mode.

In either case, the receiver 3 can detect the locations of the four transmitters and thus those of the four tires through performing any of the tire location detection processes described in the third to fifth embodiments.

Consequently, the tire inflation pressure detecting apparatus S6 would have the same advantages as the tire inflation pressure detecting apparatuses S3-S5.

Further, with the above configuration, it is possible for the receiver 3 to transmit, in case of necessity, the trigger signals via both the transmitting antennas 31 to all of the four transmitters, thereby causing the transmitters to perform a necessary task, such as instantly transmitting the respective frames to the receiver 3.

Consequently, the tire inflation pressure detecting apparatus S6 is provided with a further advantage of being capable of performing two-way communication between the receiver 3 and all of the transmitters.

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments, each of the transmitters 2a-2d is configured to include two G sensors 22a and 22b to detect the rotation direction of the wheel on which that transmitter is mounted.

However, each of the transmitters 2a-2d may also be configured to include the G sensor 22b for sensing the tangential acceleration of the wheel and a traveling direction detecting device (e.g. a gear position sensor) for detecting the traveling direction of the vehicle 1, instead of the G sensor 22a. With this configuration, it is possible to detect the rotation direction of the wheel based on the tangential acceleration signal outputted from the G sensor 22b and a traveling direction signal that is outputted from the traveling direction detecting device and indicative of the traveling direction of the vehicle 1.

Such modifications, changes, and improvements within the skill of the art are possible within the scope of the appended claims.

What is claimed is:

1. A tire location detecting apparatus, which is provided on a vehicle to detect locations of four tires each of which is fitted on one of a front-right, a front-left, a rear-right, and a rear-left wheel of the vehicle, comprising:

four rotation direction detecting devices each of which is mounted on one of the four wheels of the vehicle to detect rotation direction of the wheel and outputs a rotation direction signal representative of the detected rotation direction;

four transmitters each of which is mounted on one of the four wheels of the vehicle to have association with the tire and the rotation direction detecting device on the one of the wheels, each of the transmitters working to transmit, at a predetermined time, an identification signal specific thereto along with the rotation direction signal outputted from the associated rotation direction detecting device;

a triggering device disposed on a body of the vehicle, the triggering device working to send out a trigger signal which causes the transmitter on a first one of the four wheels of the vehicle to transmit the identification signal specific thereto in response to the trigger signal;

a receiver arranged on the body of the vehicle, the receiver working to receive all of the identification and rotation direction signals transmitted by the transmitters at the predetermined times, the receiver also working to receive the identification signal transmitted by the transmitter on the first wheel in response to the trigger signal;

a controller electrically connected with the triggering device and the receiver to control operations of the triggering device and the receiver, the controller also performing:

a first process of identifying the transmitter and the tire on the first wheel of the vehicle based on the identification signal transmitted by the transmitter on the first wheel in response to the trigger signal, and a second process of determining, for each of the transmitters, whether the transmitter and the associated tire are located on one of the right-side wheels or one of the left-side wheels of the vehicle based on the rotation direction signal transmitted from the transmitter; and wherein the controller includes a memory and has stored in the memory reference identification signals, each of which coincides with the identification signal specific to one of the transmitters and is associated with one of the wheels, and a plurality of tire location sequences available for the tires of the vehicle, and wherein the controller further performs a third process of determining whether a tire rotation has been made for the tires of the vehicle through comparison of the identification signal specific to the transmitter that is currently on the first wheel with the reference identification signal stored in the memory in association with the first wheel.

2. The tire location detecting apparatus as set forth in claim 1, wherein, if it is determined through the third process that no tire rotation has been made for the tires, the controller further performs a fourth process of identifying each of the transmitters and associated tires on the other three wheels of the vehicle based on the reference identification signals stored in the memory in association with the three wheels.

3. The tire location detecting apparatus as set forth in claim 1, wherein, if it is determined through the third process that a tire rotation has been made for the tires, the controller further performs:

a fourth process of identifying the transmitter and the tire on a second one of the wheels of the vehicle which has the same right/left location as the first wheel, a fifth process of identifying, among the plurality of tire rotation sequences stored in the memory, the tire rotation sequence in which the tire rotation has been made for the tires of the vehicle through comparison of the identification signals specific to the transmitters that are currently on the first and second wheels with all of the reference identification signals stored in the memory, and a sixth process of identifying each of the transmitters and associated tires on a third and a fourth one of the wheels, both of which have a right/left location opposite to that of the first and second wheels, based on the identified tire rotation sequence.

4. The tire location detecting apparatus as set forth in claim 1, wherein each of the rotation direction detecting devices is integrated into the associated one of the transmitters, and both the triggering device and the controller are integrated into the receiver.

5. A tire location detecting apparatus, which is provided on a vehicle to detect locations of four tires each of which is fitted on one of a front-right, a front-left, a rear-right, and a rear-left wheel of the vehicle, comprising:
 four rotation direction detecting devices each of which is mounted on one of the four wheels of the vehicle to detect rotation direction of the wheel and outputs a rotation direction signal representative of the detected rotation direction;
 four transmitters each of which is mounted on one of the four wheels of the vehicle to have association with the tire and the rotation direction detecting device on the one of the wheels, each of the transmitters working to transmit, at a predetermined time, an identification signal specific thereto along with the rotation direction signal outputted from the associated rotation direction detecting device;
 a triggering device disposed on a body of the vehicle, the triggering device working to send out a trigger signal which causes the transmitter on a first one of the four wheels of the vehicle to transmit the identification signal specific thereto in response to the trigger signal;
 a receiver arranged on the body of the vehicle, the receiver working to receive all of the identification and rotation direction signals transmitted by the transmitters at the predetermined times, the receiver also working to receive the identification signal transmitted by the transmitter on the first wheel in response to the trigger signal;
 a controller electrically connected with the triggering device and the receiver to control operations of the triggering device and the receiver, the controller also performing:
 a first process of identifying the transmitter and the tire on the first wheel of the vehicle based on the identification signal transmitted by the transmitter on the first wheel in response to the trigger signal; and
 a second process of determining, for each of the transmitters, whether the transmitter and the associated tire are located on one of the right-side wheels or one of the left-side wheels of the vehicle based on the rotation direction signal transmitted from the transmitter; and
 wherein the tire location detecting apparatus further comprises a second triggering device, which is disposed on the body of the vehicle to send out a second trigger signal which causes the transmitter on a second one of the four wheels, which has a right/left location opposite to that of the first wheel, to transmit the identification signal specific thereto in response to the second trigger signal,
 wherein, the receiver further works to receive the identification signal transmitted by the transmitter on the second wheel in response to the second trigger signal, and
 the controller further performs:
 a third process of identifying the transmitter and the tire on the second wheel of the vehicle based on the identification signal transmitted by the transmitter on the second wheel in response to the second trigger signal,
 a fourth process of identifying the transmitter and the tire on a third one of the four wheels which has the same right/left location as the first wheel, and
 a fifth process of identifying the transmitter and the tire on a fourth one of the four wheels which has the same right/left location as the second wheel.

6. The tire location detecting apparatus as set forth in claim 5, wherein each of the rotation direction detecting devices is integrated into the associated one of the transmitters, and both the triggering device and the controller are integrated into the receiver.

7. A tire location detecting apparatus, which is provided on a vehicle to detect locations of four tires each of which is fitted on one of a front-right, a front-left, a rear-right, and a rear-left wheel of the vehicle, comprising:
 four rotation direction detecting devices each of which is mounted on one of the four wheels of the vehicle to detect rotation direction of the wheel and outputs a rotation direction signal representative of the detected rotation direction;
 four transmitters each of which is mounted on one of the four wheels of the vehicle to have association with the tire and the rotation direction detecting device on the one of the wheels, each of the transmitters working to transmit, at a predetermined time, an identification signal specific thereto along with the rotation direction signal outputted from the associated rotation direction detecting device;
 a triggering device disposed on a body of the vehicle, the triggering device working to send out a trigger signal which causes the transmitter on a first one of the four wheels of the vehicle to transmit the identification signal specific thereto in response to the trigger signal;
 a receiver arranged on the body of the vehicle, the receiver working to receive all of the identification and rotation direction signals transmitted by the transmitters at the predetermined times, the receiver also working to receive the identification signal transmitted by the transmitter on the first wheel in response to the trigger signal;
 a controller electrically connected with the triggering device and the receiver to control operations of the triggering device and the receiver, the controller also performing:
 a first process of identifying the transmitter and the tire on the first wheel of the vehicle based on the identification signal transmitted by the transmitter on the first wheel in response to the trigger signal, and
 a second process of determining, for each of the transmitters, whether the transmitter and the associated tire are located on one of the right-side wheels or one of the left-side wheels of the vehicle based on the rotation direction signal transmitted from the transmitter; and
 wherein, the trigger signal sent out from the triggering device further causes the transmitter on a second one of the four wheels, which has a right/left location opposite to that of the first wheel, to transmit the identification signal specific thereto in response to the trigger signal,
 the receiver further works to receive the identification signal transmitted by the transmitter on the second wheel in response to the trigger signal, and
 the controller further performs:
 a third process of identifying the transmitter and the tire on the second wheel of the vehicle based on the identification signal transmitted by the transmitter on the second wheel in response to the trigger signal,
 a fourth process of identifying the transmitter and the tire on a third one of the four wheels which has the same right/left location as the first wheel, and
 a fifth process of identifying the transmitter and the tire on a fourth one of the four wheels which has the same right/left location as the second wheel.

8. The tire location detecting apparatus as set forth in claim 7, wherein the transmitter on the first wheel transmits the identification signal specific thereto immediately after the sending out of the trigger signal by the triggering device, while the transmitter on the second wheel transmits the identification signal specific thereto after a predetermined time Tw from the sending out of the trigger signal by the triggering device.

9. The tire location detecting apparatus as set forth in claim 8, wherein the time Tw is predetermined to be longer than a time Ttf required for the transmitter on the first wheel to transmit the identification signal specific thereto to the receiver.

10. The tire location detecting apparatus as set forth in claim 7, wherein in response to the trigger signal, the transmitter on the first wheel transmits a plurality of times the identification signal specific thereto at time intervals of Twr, while the transmitter on the second wheel transmits a plurality of times the identification signal specific thereto at time intervals of Twl, Twl being longer than Twr.

11. The tire location detecting apparatus as set forth in claim 10, wherein,

Twr>Ttf, and

Twl>Ttf+Twr, where, Ttf is a time required for the transmitter on the first wheel to complete one transmission of the identification signal specific thereto.

12. The tire location detecting apparatus as set forth in claim 7 further comprising a second triggering device, which is disposed on the body of the vehicle to send out a second trigger signal which causes both the transmitters on the third and fourth wheels of the vehicle to transmit the respective identification signals in response to the second trigger signal, wherein, the receiver further works to receive the identification signals transmitted by the transmitters on the third and fourth wheels in response to the second trigger signal, and instead of the second, fourth, and fifth processes, the controller performs:

a sixth process of identifying the transmitter and the tire on the third wheel of the vehicle based on the identification signal transmitted by the transmitter on the third wheel in response to the second trigger signal, and a seventh process of identifying the transmitter and the tire on the fourth wheel of the vehicle based on the identification signal transmitted by the transmitter on the fourth wheel in response to the second trigger signal.

13. The tire location detecting apparatus as set forth in claim 7, wherein each of the rotation direction detecting devices is integrated into the associated one of the transmitters, and both the triggering device and the controller are integrated into the receiver.

14. A tire location detecting apparatus, which is provided on a vehicle to detect locations of four tires each of which is fitted on one of a front-right, a front-left, a rear-right, and a rear-left wheel of the vehicle, comprising:

four rotation direction detecting devices each of which is mounted on one of the four wheels of the vehicle to detect rotation direction of the wheel and outputs a rotation direction signal representative of the detected rotation direction;

four transmitters each of which is mounted on one of the four wheels of the vehicle to have association with the tire and the rotation direction detecting device on the one of the wheels, each of the transmitters working to transmit, at a predetermined time, an identification signal specific thereto along with the rotation direction signal outputted from the associated rotation direction detecting device;

a triggering device disposed on a body of the vehicle, the triggering device working to send out a trigger signal which causes the transmitter on a first one of the four wheels of the vehicle to transmit the identification signal specific thereto in response to the trigger signal;

a receiver arranged on the body of the vehicle, the receiver working to receive all of the identification and rotation direction signals transmitted by the transmitters at the predetermined times, the receiver also working to receive the identification signal transmitted by the transmitter on the first wheel in response to the trigger signal;

a controller electrically connected with the triggering device and the receiver to control operations of the triggering device and the receiver, the controller also performing:

a first process of identifying the transmitter and the tire on the first wheel of the vehicle based on the identification signal transmitted by the transmitter on the first wheel in response to the trigger signal, and a second process of determining, for each of the transmitters, whether the transmitter and the associated tire are located on one of the right-side wheels or one of the left-side wheels of the vehicle based on the rotation direction signal transmitted from the transmitter; and wherein each of the rotation direction detecting devices includes a first accelerometer, which works to output a first acceleration signal representative of a centrifugal acceleration of the wheel, and a second accelerometer, which works to output a second acceleration signal representative of a tangential acceleration of the wheel, and determines the rotation direction of the wheel based on the lead/lag relationship in phase between the first and second acceleration signals.

15. The tire location detecting apparatus as set forth in claim 14, wherein each of the rotation direction detecting devices is integrated into the associated one of the transmitters, and both the triggering device and the controller are integrated into the receiver.

16. A tire location detecting apparatus, which is provided on a vehicle to detect locations of four tires each of which is fitted on one of a front-right, a front-left, a rear-right, and a rear-left wheel of the vehicle, comprising:

four rotation direction detecting devices each of which is mounted on one of the four wheels of the vehicle to detect rotation direction of the wheel and outputs a rotation direction signal representative of the detected rotation direction;

four transmitters each of which is mounted on one of the four wheels of the vehicle to have association with the tire and the rotation direction detecting device on the one of the wheels, each of the transmitters working to transmit, at a predetermined time, an identification signal specific thereto along with the rotation direction signal outputted from the associated rotation direction detecting device;

a triggering device disposed on a body of the vehicle, the triggering device working to send out a trigger signal which causes the transmitter on a first one of the four wheels of the vehicle to transmit the identification signal specific thereto in response to the trigger signal;

a receiver arranged on the body of the vehicle, the receiver working to receive all of the identification and rotation direction signals transmitted by the transmitters at the predetermined times, the receiver also working to receive the identification signal transmitted by the transmitter on the first wheel in response to the trigger signal;

a controller electrically connected with the triggering device and the receiver to control operations of the triggering device and the receiver, the controller also performing:

a first process of identifying the transmitter and the tire on the first wheel of the vehicle based on the identification signal transmitted by the transmitter on the first wheel in response to the trigger signal, and a second process of determining, for each of the transmitters, whether the transmitter and the associated tire are located on one of the right-side wheels or one of the left-side wheels of the vehicle based on the rotation direction signal transmitted from the transmitter; and wherein the tire location detecting apparatus is integrated into a tire inflation pressure detecting apparatus provided on the vehicle to detect inflation pressures of the tires, and wherein, the tire inflation pressure detecting apparatus further includes four pressure sensors, each of which is mounted on one of the four wheels of the vehicle to sense inflation pressure of the tire on the wheel and output a pressure signal representative of the sensed inflation pressure, each of the transmitters works to transmit, at the predetermined time, the pressure signal outputted from an associated one of the pressure sensors along with the identification signal and the rotation direction signal, the receiver works to receive all of the pressure, identification, and rotation direction signals transmitted by the transmitters at the predetermined times, and the controller further performs a third process of determining, for each of the transmitters, the inflation pressure of the tire associated with the transmitter based on the pressure signal transmitted form the transmitter.

17. The tire location detecting apparatus as set forth in claim 16, wherein each of the rotation direction detecting devices is integrated into the associated one of the transmitters, and both the triggering device and the controller are integrated into the receiver.

* * * * *